(12) United States Patent
Silveira et al.

(10) Patent No.: US 12,445,236 B2
(45) Date of Patent: Oct. 14, 2025

(54) PARALLEL REDUNDANCY PROTOCOL ERROR DETECTION

(71) Applicant: Schweitzer Engineering Laboratories, Inc., Pullman, WA (US)

(72) Inventors: Mauricio G. Silveira, Pullman, WA (US); Bharat Nalla, Ashburn, VA (US); Rajeev Kumar Babu, Hutto, TX (US); David J. Dolezilek, Pullman, WA (US); Edson L. Hernandez Cortinas, Pullman, WA (US); Nishchal Sharma, Vancouver, WA (US); Andrew W. Rash, Pullman, WA (US); Andrew A. Miller, Moscow, ID (US); Lihua Ran, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 337 days.

(21) Appl. No.: 18/363,082

(22) Filed: Aug. 1, 2023

(65) Prior Publication Data
US 2025/0047427 A1    Feb. 6, 2025

(51) Int. Cl.
H04L 1/22        (2006.01)
*H04L 1/1867*    (2023.01)
*H04L 41/0604*   (2022.01)

(52) U.S. Cl.
CPC .............. *H04L 1/22* (2013.01); *H04L 1/1867* (2013.01); *H04L 41/0622* (2013.01)

(58) Field of Classification Search
CPC ..... H04L 1/22; H04L 1/1867; H04L 41/0622; H04L 1/08
See application file for complete search history.

(56) References Cited

U.S. PATENT DOCUMENTS

| 6,747,957 | B1 | 6/2004 | Pithawala |
| 7,218,632 | B1 | 5/2007 | Bechtolsheim |
| 7,266,849 | B1 | 9/2007 | Gregory |
| 7,376,831 | B2 | 5/2008 | Kollmyer |
| 7,872,983 | B2 | 1/2011 | Lai |
| 8,347,079 | B2 | 1/2013 | Cho |

(Continued)

FOREIGN PATENT DOCUMENTS

| EP | 2765751 | 8/2014 |
| KR | 20150051107 | 5/2015 |

(Continued)

OTHER PUBLICATIONS

Braun, Wolfgang, Menth, Michael, Software-Defined Networking Using OpenFlow: Protocols, Applications and Architectural Design Choices, Future Internet, May 12, 2014.

(Continued)

*Primary Examiner* — Shawn D Miller
(74) *Attorney, Agent, or Firm* — Justin K. Flanagan

(57) ABSTRACT

This disclosure pertains to systems and methods to detect network errors in a parallel redundant protocol (PRP) network. A node-level redundancy error subsystem of an intelligent electronic device (IED) maintains records (e.g., counts) of information associated with missing duplicate frames expected from node devices on the PRP network via redundant first and second local area networks (LANs). Non-zero counts of missing duplicate frames may be identified as network errors.

20 Claims, 11 Drawing Sheets

(56) References Cited

U.S. PATENT DOCUMENTS

| | | |
|---|---|---|
| 8,520,670 B1 | 8/2013 | Giniger |
| 8,553,544 B2 | 10/2013 | Lai |
| 8,800,044 B2 | 8/2014 | Raad |
| 8,989,380 B1 | 3/2015 | Belser |
| 9,038,151 B1 | 5/2015 | Chua |
| 9,237,129 B2 | 1/2016 | Ling |
| 9,286,171 B2 | 3/2016 | Cardona |
| 9,432,255 B1 | 8/2016 | Hasan |
| 9,432,380 B2 | 8/2016 | Margalit |
| 9,680,588 B2 | 6/2017 | Connolly |
| 9,686,125 B2 | 6/2017 | Smith |
| 9,760,504 B2 | 9/2017 | Chinnakkonda Vidyapoornachary |
| 9,769,060 B2 | 9/2017 | Dearien |
| 10,863,558 B2 | 12/2020 | Powers |
| 11,165,685 B2 | 11/2021 | Mullis |
| 11,228,521 B2 | 1/2022 | Mullis |
| 2002/0023217 A1 | 2/2002 | Wheeler |
| 2002/0172157 A1 | 11/2002 | Rhodes |
| 2003/0112821 A1 | 6/2003 | Cleveland |
| 2003/0125924 A1 | 7/2003 | Lines |
| 2003/0133443 A1 | 7/2003 | Klinker |
| 2003/0188159 A1 | 10/2003 | Josset |
| 2005/0025141 A1 | 2/2005 | Chao |
| 2005/0078672 A1 | 4/2005 | Caliskan |
| 2005/0192008 A1 | 9/2005 | Desai |
| 2007/0143838 A1 | 6/2007 | Milligan |
| 2007/0217344 A1 | 9/2007 | Krywaniuk |
| 2008/0005558 A1 | 1/2008 | Hadley |
| 2008/0080384 A1 | 4/2008 | Atkins |
| 2008/0184030 A1 | 7/2008 | Kelly |
| 2008/0204248 A1 | 8/2008 | Cam Winget |
| 2009/0252309 A1 | 10/2009 | Beyer |
| 2009/0257743 A1 | 10/2009 | Chung |
| 2009/0265470 A1 | 10/2009 | Shen |
| 2009/0285093 A1 | 11/2009 | Bolt |
| 2009/0313189 A1 | 12/2009 | Sun |
| 2010/0241608 A1 | 9/2010 | Huang |
| 2011/0085567 A1 | 4/2011 | Beecroft |
| 2011/0087952 A1 | 4/2011 | Marin |
| 2013/0035066 A1 | 2/2013 | Nylander |
| 2013/0067552 A1 | 3/2013 | Hawkes |
| 2013/0077477 A1 | 3/2013 | Daraiseh |
| 2013/0108259 A1 | 5/2013 | Srinivas |
| 2013/0159865 A1 | 6/2013 | Smith |
| 2013/0212285 A1 | 8/2013 | Hoffmann |
| 2013/0227646 A1 | 8/2013 | Haggerty |
| 2013/0250770 A1 | 9/2013 | Zou |
| 2013/0263247 A1 | 10/2013 | Jungck |
| 2013/0290735 A1 | 10/2013 | Rombouts |
| 2013/0294228 A1 | 11/2013 | Ahuja |
| 2014/0025945 A1 | 1/2014 | McGrew |
| 2014/0029451 A1 | 1/2014 | Nguyen |
| 2014/0064100 A1 | 3/2014 | Edwards |
| 2014/0112130 A1 | 4/2014 | Yang |
| 2014/0115706 A1 | 4/2014 | Silva |
| 2014/0129700 A1 | 5/2014 | Mehta |
| 2014/0153572 A1 | 6/2014 | Hampel |
| 2014/0160939 A1 | 6/2014 | Arad |
| 2014/0226467 A1 | 8/2014 | Park |
| 2014/0241345 A1 | 8/2014 | DeCusatis |
| 2014/0245387 A1 | 8/2014 | Colpo |
| 2014/0280834 A1 | 9/2014 | Medved |
| 2014/0325038 A1 | 10/2014 | Kis |
| 2014/0325649 A1 | 10/2014 | Zhang |
| 2014/0371941 A1 | 12/2014 | Keller |
| 2014/0376406 A1 | 12/2014 | Kim |
| 2015/0081762 A1 | 3/2015 | Mason |
| 2015/0112933 A1 | 4/2015 | Satapathy |
| 2015/0195190 A1 | 7/2015 | Shah Heydari |
| 2015/0312658 A1 | 10/2015 | Winzer |
| 2015/0363522 A1 | 12/2015 | Maurya |
| 2016/0043996 A1 | 2/2016 | Syed Mohamed |
| 2016/0119299 A1 | 4/2016 | Amulothu |
| 2016/0142427 A1 | 5/2016 | de los Reyes |
| 2016/0165454 A1 | 6/2016 | Li |
| 2016/0277195 A1 | 9/2016 | Maeda |
| 2016/0330076 A1 | 11/2016 | Tiwari |
| 2016/0337247 A1 | 11/2016 | Yao |
| 2016/0344592 A1 | 11/2016 | Cook |
| 2016/0359629 A1 | 12/2016 | Nadathur |
| 2017/0026187 A1 | 1/2017 | Ramatchandirane |
| 2017/0026225 A1 | 1/2017 | Smith |
| 2017/0026226 A1 | 1/2017 | Grussling |
| 2017/0026243 A1 | 1/2017 | Berner |
| 2017/0026252 A1 | 1/2017 | Dearien |
| 2017/0026276 A1 | 1/2017 | Dearien |
| 2017/0026291 A1 | 1/2017 | Smith |
| 2017/0026292 A1 | 1/2017 | Smith |
| 2017/0026349 A1 | 1/2017 | Smith |
| 2017/0201488 A1 | 7/2017 | Krywaniuk |
| 2017/0289117 A1 | 10/2017 | Powers |
| 2017/0302656 A1 | 10/2017 | Ramatchandirane |
| 2017/0317780 A1 | 11/2017 | Wood |
| 2017/0346630 A1 | 11/2017 | Nadathur |
| 2018/0027405 A1 | 1/2018 | Holtmanns |
| 2019/0116053 A1 | 4/2019 | Allan |
| 2019/0273717 A1 | 9/2019 | Dearien |
| 2020/0021513 A1 | 1/2020 | Hedge |
| 2020/0136999 A1 | 4/2020 | Levy-Abegnoli |
| 2021/0135972 A1 | 5/2021 | Mullis |
| 2021/0194791 A1 | 6/2021 | Mullis |
| 2022/0271854 A1 | 8/2022 | Maruyama |
| 2023/0066212 A1 | 3/2023 | Mullis |
| 2023/0379081 A1* | 11/2023 | Sivasiva Ganesan .... H04L 1/08 |

FOREIGN PATENT DOCUMENTS

| | | |
|---|---|---|
| WO | 2011133912 | 10/2011 |
| WO | 2015038040 | 3/2015 |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

Yang, Qiaoyin and Smith, Rhett, Improve Protection Communications Network Reliability Through Software-Defined Process Bus, Jan. 2018.

Dearien, Jason: "Setting Up a Fully Redundant RSTP-to-SDN Tie Point" Application Guide, vol. II AG2017-28, Sep. 22, 2017.

\* cited by examiner

PARALLEL REDUNDANCY PROTOCOL ERROR DETECTION

TECHNICAL FIELD

The present disclosure pertains to systems and methods for detecting errors in IEC 61850 Sampled Value and GOOSE parallel redundancy protocol (PRP) networks, including in software-defined networks (SDNs).

DETAILED DESCRIPTION

Figure 1:
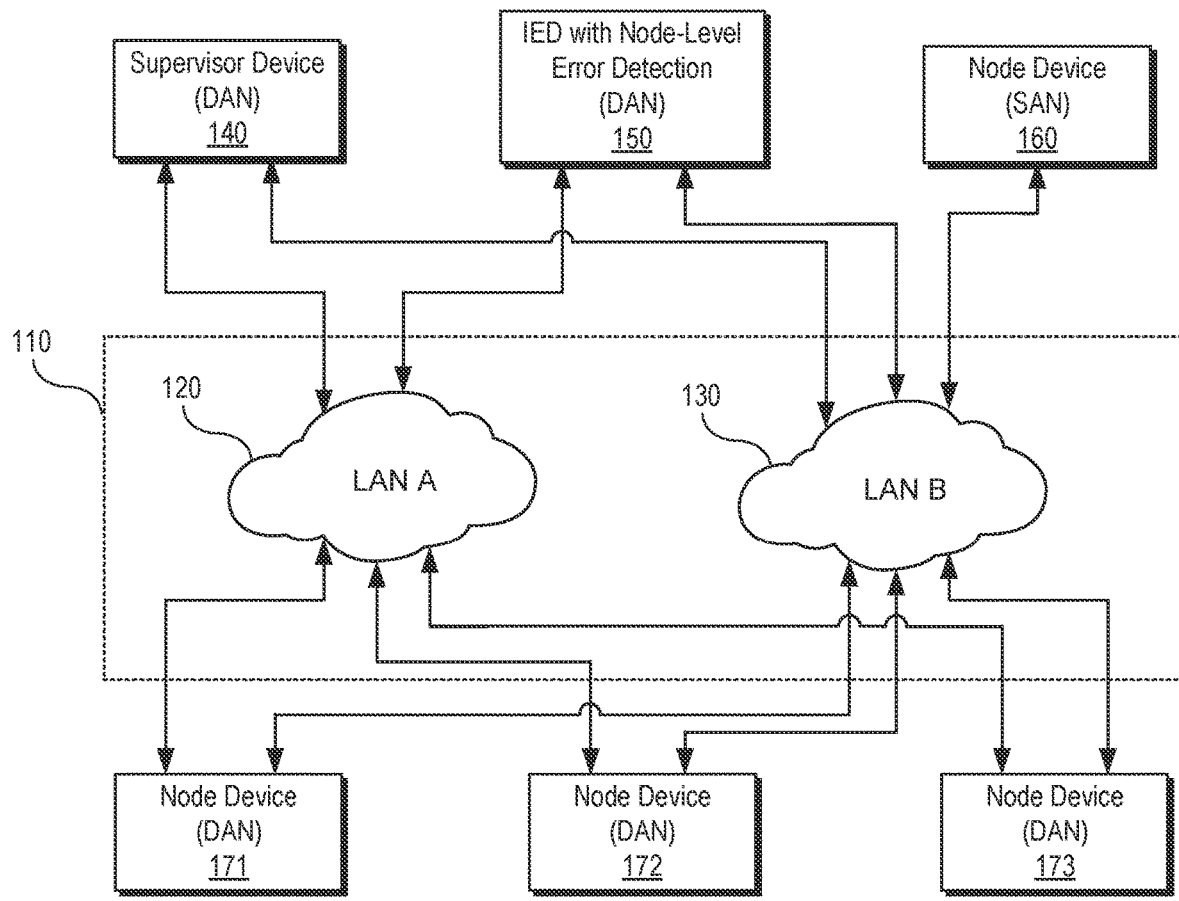
FIG. 1 illustrates a block diagram of a plurality of devices connected in a parallel redundancy protocol (PRP) network, according to one embodiment.

Parallel redundancy protocol (PRP) is a network protocol standard for Ethernet networks that provides redundancy and protects against single points of failure. A PRP-enabled device has two communication ports, each of which is attached to a separate local area network (LAN). The two LANs may use distinct physical links to avoid a single point of failure and thus may be assumed to be fail-independent. As long as one path is operational, the destination application always receives at least one frame (e.g., data packet). The redundancy provided by PRP may be implemented by network devices and thus may be invisible to applications. Throughout this disclosure, the term "frame" is used quasi-synonymously with the term "data packet," where a data packet refers to a protocol data unit (PDU) in layer 3 (network layer) of the open systems interconnection (OSI) network model and a frame represents the PDU in layer 2 (data link) of the OSI model.

High reliability and redundant communication networks, such as PRP, are useful in critical infrastructure systems, such as electric power systems, telecommunication systems, manufacturing systems, alarm systems, and a variety of other applications. Devices in a PRP network may manage, monitor, and/or control a wide range of devices. Large volumes of data may be generated and transmitted within a PRP network. In some instances, traditional network devices may implement and manage the PRP network. In other instances, the PRP network may be part of a software-defined network (SDN) configured via an SDN controller.

Devices or "nodes" in a standard PRP network utilizing the IEC 62439-3 specification do not self-announce failures. Instead, PRP devices may transmit supervision frames at specific intervals that provide a status. In some instances, these supervision frames, or lack thereof, may be used by other devices to diagnose or detect failures. However, as described in greater detail below, the use of supervision frames is not sufficient to diagnose or detect all types of possible failures. In many instances, the redundancy provided by the two LANs in a PRP network is transparent to the application layer of the node device. Accordingly, operators and supervisory devices may remain unaware that the system is at an increased risk for failure. As long as frames are being received on one of the LANs in the PRP network, failures, errors, and disconnections on the other LAN may be unnoticed. Detecting the loss of redundancy is especially important in PRP networks used to increase the redundancy of communications between devices using GOOSE and Sampled Value (SV) protocols, which are commonly used in mission-critical scenarios.

This disclosure includes systems and methods to detect protocol-specific network-level failures in a PRP network and node-level network failures in a PRP network. As described herein, an IED can detect node-level network failures in a PRP network and self-announce the PRP LAN error based on the application protocol. Notably, the failure can be detected and self-announced with respect to the specific protocol of interest. While some PRP networks may utilize a proxy service message (e.g., PRP supervision frames), this approach does not guarantee that frames associated with a particular protocol are being received. The PRP supervision frames may indicate that the link between two devices in a PRP network is functional even though frames associated with a particular protocol may not be flowing. The PRP supervision frames can only confirm the functionality of the connection for frames using the protocol of the PRP supervision frame itself, which may not be useful.

In various embodiments, a system includes a PRP network with multiple LANs, including a first LAN (e.g., LAN A) and a second LAN (e.g., LAN B). The systems and methods described herein utilize information from the protocol application layers and the PRP redundancy check trailer (RCT) (see, e.g., IEC 62439-3:2018). The protocol application layer determines the type of traffic that is received by a particular IED. The link redundancy entity of the IED manages duplicate frames received by each of the first and second LANs of the PRP network by forwarding (e.g., processing and using) the first frame received on either one of the first or second LANs and discarding the second, frame received on the other LAN. The first frame is referred to as the "forwarded duplicate frame" and the second frame is referred to as the "discarded duplicate frame." Throughout this disclosure, each set of PRP frames may include "forwarded duplicate frames" (e.g., Frame 1, Frame 2, Frame 3, . . . etc.), and corresponding "discarded duplicate frames" (e.g., Frame 1', Frame 2', Frame 3', . . . etc.). The first frame to be received by the IED is the forwarded duplicate frame and is referred to herein as Frame 1, regardless of whether it is received via the first LAN (LAN A) or the second LAN (LAN B). The discarded duplicate frame received via the other LAN is referred to as Frame 1'. Thus, neither LAN A nor LAN B is considered a "backup" LAN or the "duplicate" LAN. Rather, the first frame to arrive is considered the forwarded duplicate frame (Fame 1) that is forwarded for use by the application, and the second-in-time, discarded duplicate frame (Frame 1') is discarded.

As an example, an IED may receive Frame 1 via LAN B and forward Frame 1 to the application (e.g., application layer) for use. Frame 1' may be subsequently received via LAN A and discarded by the link redundancy entity. Frame 2 may then be received by LAN A and forwarded for use. Frame 3 may then be received via LAN B and forwarded for use. Subsequently, Frame 3' is received via LAN A, and Frame 2' is received via LAN B. The link redundancy entity discards Frame 2' and Frame 3' as discarded duplicate frames. Thus, the frame considered the "discarded duplicate frame" is not dependent upon which LAN conveyed the frame but rather on the timing of the received frame.

As frames may arrive at different times and, in some instances, out of order, the link redundancy entity uses RCT to identify received frames and determines whether a given frame should be forwarded (i.e., used by the device, processed, consumed, or passed on to the application layer of the device) or discarded. The IED may maintain a count of the number of frames expected to be received on each of PRP LANs and discarded. A frame expected to be received by a LAN and discarded is referred to herein as a "missing duplicate frame." Those of skill in the art may alternatively refer to a "missing duplicate frame" as a "non-received duplicate frame." In a fully functional PRP system, for every forwarded duplicate frame received by one LAN, a discarded duplicate frame is received on the other LAN. For example, Frame 1 may be received by the first LAN and considered the forwarded duplicate frame. Frame 1' may arrive some time later via the second LAN and be considered the discarded duplicate frame. During the interval of time between the arrival of Frame 1 and Frame 1', Frame 1' may be identified as a "missing duplicate frame" that is expected to arrive via the second LAN within a short amount of time. Once Frame 1' arrives, it is discarded as the discarded duplicate frame and is no longer considered a missing duplicate frame.

According to various embodiments, the IED may increment a count of the number of missing duplicate frames expected to arrive on each of the PRP LANs. For each forwarded duplicate frame on the first LAN, the IED may increment a count of missing duplicate frames expected to arrive via the second LAN. Similarly, the IED may increment a count of missing duplicate frames expected to arrive via the first LAN each time a forwarded duplicate frame is received on the second LAN.

The IED may maintain the counts for all missing duplicate frames regardless of the origin, payload, or associated communication protocol of their corresponding forwarded duplicate frames. Alternatively, the IED may maintain the counts for only missing duplicate frames expected from specific origins (i.e., one or more specific devices on the network), for only missing duplicate frames corresponding to forwarded duplicate frames having specific payload contents or characteristics (e.g., determined via payload frame inspection), and/or for only missing duplicate frames corresponding to forwarded duplicate frames associated with specific communication protocols.

When the IED, connected devices, and the PRP network are functioning correctly, each duplicate frame is received via the first and second LANs (e.g., LAN A and LAN B). One of the duplicate frames is utilized and considered the forwarded duplicate frame, and the other duplicate frame, which arrives later via the other LAN, is discarded as the discarded duplicate frame. Accordingly, the count of the number of forwarded duplicate frames on one LAN subtracted by the number of discarded duplicate frames on the other LAN should be zero, or decremented to zero within a short period of time.

According to various embodiments, the IED may maintain a count of forwarded duplicate frames, discarded duplicate frames, and/or missing duplicate frames. In various embodiments, the IED maintains a count of missing duplicate frames for each LAN. In a fully functional PRP network, the count of missing duplicate frames will be zero or decremented to zero within a short period of time. Each forwarded duplicate frame received on one LAN temporarily increments the count of missing duplicate frames expected to be received on the other LAN. Once the duplicate frame arrive on the other LAN, it is discarded as discarded duplicate frame and the count of missing duplicate frames is decremented.

However, if one LAN is disconnected or stops functioning, the count of missing duplicate frames will be non-zero for a salient amount of time, indicating a problem. The IED can self-announce the detected error, trigger a relay warning, notify a user, display a notification on a graphical user interface, transmit an error message, generate a human-interface device alert, map the error to a relay Sequential Event Recorded (SER), close a physical output, and/or transmit the error to a supervisory device, such as a supervisory control and data acquisition (SCADA) controller, or the like.

Each of a plurality of node devices is connected to the LANs as part of the PRP network. At least one of the node devices may be an IED connected to the PRP network via the first LAN (LAN A) and the second LAN (LAN B). The IED includes, as described herein, a network-level error detection subsystem to detect a failed LAN connection and a link redundancy entity (LRE) to manage duplicate frames received from each of the node devices. The IED includes a node-level redundancy error detection subsystem that maintains a first record of information for missing duplicate frames expected from the plurality of node devices via the first LAN and maintains a second record of information for missing duplicate frames expected from the plurality of node devices via the second LAN. The count of missing duplicate frames in each of the first and second records of information for the first and second LANs, respectively, should be zero if every frame (forwarded duplicate frame) and its duplicate (discarded duplicate frame) arrive correctly.

For each frame received by one of the LANs, a corresponding duplicate frame should be received via the other LAN and discarded. As a specific example, the IED may receive Frame 1 via LAN A. The IED may use or forward Frame 1 for use. The duplicate frame, Frame 1', is expected to be received via LAN B within a short period of time (a delay time window). The IED may add information identifying missing Frame 1' to the second record of information (associated with LAN B). Once the duplicate frame, Frame 1', is received via LAN B, the second record of information is updated to remove the entry regarding Frame 1', and the link redundancy entity discards Frame 1'.

If Frame 1' is not received within the delay time window (a delay threshold time value), then a discrepancy counter is incremented. The IED detects a node-level redundancy error based on a function of the discrepancy counter value exceeding a discrepancy threshold value for a discrepancy threshold time value. In some implementations, the IED may detect a node-level redundancy error in response to the discrepancy counter exceeding 0 for any amount of time. In other embodiments, the IED may only detect a node-level redundancy error in response to the discrepancy counter exceeding a discrepancy threshold value for longer than a discrepancy threshold amount of time. In some embodiments, the discrepancy counter may periodically decrement or reset to avoid triggering a warning based on a single failure or periodic single failures. The IED may include a reporting subsystem to report the detected node-level redundancy error.

In various implementations, the delay threshold time value is between 1 second and 15 seconds. In some instances, the first and second records include information identifying the communication protocols of the missing duplicate frames. For example, if a forwarded duplicate frame (Frame 1) is received on LAN A using a GOOSE communication protocol, the second record may be updated to include a missing duplicate frame (Frame 1') associated with the GOOSE communication protocol expected to arrive on LAN B. If the missing duplicate frame (Frame 1') arrives via LAN B within a threshold amount of time, the second record is updated to remove the entry regarding Frame 1' and Frame 1' is discarded as a discarded duplicate frame. If, however, the missing duplicate frame (Frame 1') does not arrive within the threshold amount of time, an error may be detected. The IED may identify discrepancies in the number of missing duplicate frames associated with a specific communication protocol that were expected, but did not arrive via one of the first and second LANs. For example, the IED may be specifically configured to maintain records of the missing duplicate frames that use or are otherwise associated with GOOSE and/or Sampled Values (SV) communication protocols (e.g., as described in the IEC 61850 communication protocols).

In some examples, the IED may create records or detect discrepancies in the number of missing duplicate frames on the two different LANs for only one specific communication protocol. In still other embodiments, the IED creates records and detects discrepancies in the number of missing duplicate frames on each LAN for expected frames associated with multiple specific communication protocols. In still other embodiments, the IED creates records and detects discrepancies in the number of missing duplicate frames on each LAN for all communication protocols.

In some examples, the system may utilize the recorded data to confirm the functionality of some protocols while identifying errors or failed communication in other protocols. This may be useful information to a technician attempting to fix the problem. Failed communication from a specific node device or from all node devices for all communication protocols (e.g., no frames are being received from the specific node device or from any of the node devices) is indicative of specific types of problems. Similarly, a different type of problem may be detected in response to failed communication from a specific node device or from all node devices for just one communication protocol while frames are still being received in other communication protocols.

The embodiments of the present disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order or even sequentially, nor need the steps be executed only once unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Several aspects of the embodiments described may be implemented as modules, subsystems, or components. The various modules, subsystems, and components may be implemented as explicitly described herein and in the context of the description thereof using software, hardware, and/or a combination thereof. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks, controls the operation of a hardware or mechanical component, renders a graphical user interface, and/or implements a particular data type.

In certain embodiments, a particular software module or component may comprise disparate instructions stored in different locations of a memory device, which together implement the described functionality of the module. Indeed, a module or component may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device or across several memory devices and may be linked together in fields of a record in a database across a network.

Embodiments may be provided as a computer program product, including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include but is not limited to, hard drives, optical disks, ROMs, RAMs, EPROMs, EEPROMs, magnetic or optical cards, solid-state memory devices, or other types of machine-readable media suitable for storing electronic and/or processor-executable instructions.

FIG. 1 illustrates a block diagram of a plurality of devices connected in a parallel redundancy protocol (PRP) network 110, according to one embodiment. In the illustrated example, three doubly attached node (DAN) devices, 171, 172, and 173, are each individually connected to LAN A 120 and LAN B 130. A singly attached node (SAN) device 160 is attached to only LAN B 130. Singly and doubly attached nodes are described in greater detail in IEC 62439-3:2018. An IED 150 with node-level error detection is also connected to each of LAN A 120 and LAN B 130. The illustrated example also includes a supervisor device 140 that is also connected to LAN A 120 and LAN B 130.

Figure 2:
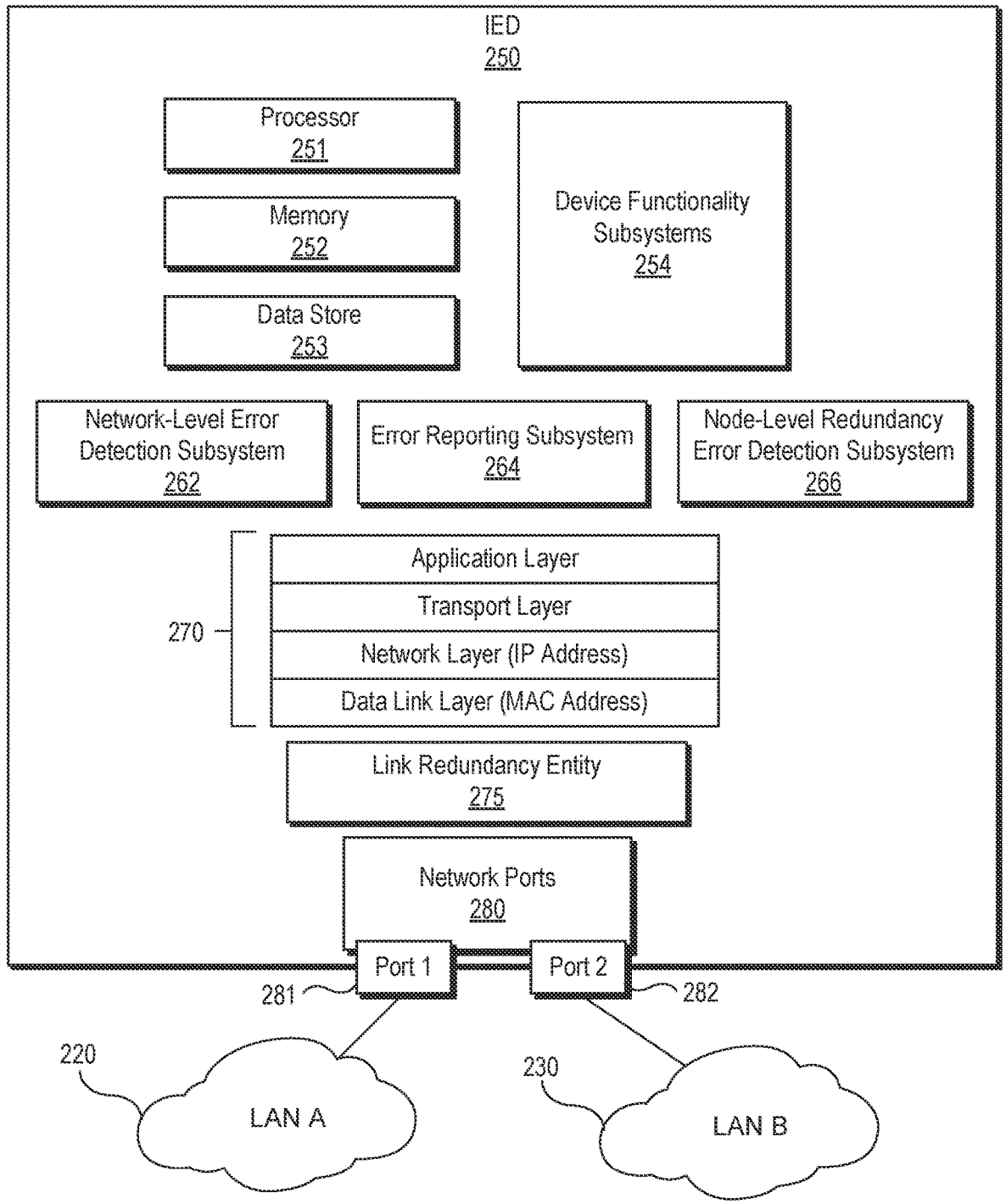
FIG. 2 illustrates a block diagram of an intelligent electronic device (IED) connected to a PRP network, according to one embodiment.

FIG. 2 illustrates a block diagram of an intelligent electronic device (IED) 250 connected to a PRP network via network ports 280, according to one embodiment. In the illustrated example, the PRP network includes a first LAN 220 (LAN A) and a second LAN 230 (LAN B). The IED 250 is connected to the first LAN 220 via a first physical network port 281 and is connected to the second LAN 230 via a second physical network port 282. The IED 250 includes a processor 251, memory 252, a data store 253, and various other subsystems, modules, computer-readable mediums, mechanical components, controllers, or the like that are encompassed by the device functionality subsystems 254.

The device functionality subsystems 254 include various components within an IED 250 that are particular to the functionality of the IED 250. For example, the IED 250 may be configured as a network device that controls communication, in which case most of the functionality of the device functionality subsystems 254 may be network related. In other embodiments, the IED 250 may, for example, be a critical infrastructure component in an electrical power distribution or generation system. For instance, the IED 250 may be a device that protects, monitors, or controls power generation or distribution in a high voltage three-phase power system. In such examples, IED 250 may receive frames via other devices on the PRP network and based on the received information, operate to trip a power breaker, control a generator frequency, calculate ground currents, make a decision to trip a breaker, calculate phasors of each phase of a three-phase power system, or the like.

The IED 250 receives redundant communications (e.g., frames, data packets, or the like) via the first LAN 220 on the first physical network port 281 and via the second LAN 230 on the second physical network port 282. The IED 250 includes a link redundancy entity (LRE) 275 that manages duplicate frames received via the first and second LANS 220 and 230. Operations performed by the LRE 275 may be, for example, part of layer 2 of the OSI network model and be transparent to other layers of the OSI network model.

For transmitting frames, the operations performed by the LRE 275 may include receiving a frame of the data link layer (e.g., data link layer 2), processing the received frame to create two duplicate frames, adding a redundancy check trailer (RCT) to the frames, and sending one of the duplicate frames through the first LAN 220 and the other duplicate frame through the second LAN 230, via the first physical network port 281 and second physical network port 282, respectively. For receiving frames, the operations of the LRE 275 include removing the RCT and sending the frame or data packet to the upper layers. In some embodiments, the LRE 275 identifies and removes duplicate received frames. In other embodiments, the duplicate frames received by the LRE may be transmitted to the upper layers of the OSI network model to be identified and deleted. For example, the LRE 275 may save the frame ID of a received frame (the forwarded duplicate frame) and then discard the next frame that arrives with the same frame ID (the discarded duplicate frame).

Additional network layers of the OSI network model are implemented by the network stack 270. The network stack 270 may include various subsystems and modules to implement, manage, and/or control network communications, including a data link layer for machine access control (MAC) addressing, a network layer for internet protocol (IP) addressing, a transport layer management, and an application layer.

The IED 250 also includes a network-level error detection subsystem 262, an error reporting subsystem 264, and a node-level redundancy error detection subsystem 266. The network-level error detection subsystem 262 may be implemented as a standalone hardware and/or software component within the IED 250. In some embodiments, the network-level error detection subsystem 262 may be implemented as part of the LRE 275 and/or as a subsystem within another portion of the network stack 270. According to various embodiments, the network-level error detection subsystem 262 operates to detect a failed or disconnected LAN. For example, the network-level error detection subsystem 262 may detect that a network cable is unplugged from one of network ports 280 and/or that network traffic is not being received via one of the first physical network port 281 or the second physical network port 282.

The network-level error detection subsystem 262 detects the failure or disconnection at the network level in that the detected failure or disconnection is only determined with respect to the IED 250 being connected to the first LAN 220 and the second LAN 230. The network-level error detection subsystem 262 does not detect or manage specific connections or traffic flow on the PRP network, protocol-specific interruptions, or communication disruptions from specific other node devices on the PRP network. As such, according to many embodiments, the network-level error detection subsystem 262 operates to detect a completely failed LAN connection, including physical disconnections or a complete lack of communication over a connected network port.

The error reporting subsystem 264 operates to report detected errors, including network errors identified by the network-level error detection subsystem 262 and the node-level redundancy error detection subsystem 266. For example, the error reporting subsystem 264 may display the error as part of a visual alert (e.g., as part of a graphical user interface) on an electronic display connected to the IED 250 or via another human interface device (HID). In other embodiments, the error reporting subsystem 264 may report the error via the PRP network and/or separate network to a supervisor device. In other embodiments, the error reporting subsystem 264 may report the error by sending a message to another device or a human operator or technician. In some embodiments, the error reporting subsystem 264 may report the error by closing a physical output contact (e.g., via a hardwired connection to the physical output contact). A monitoring device may identify or detect the closed physical output contact as corresponding to a failure being reported by the error reporting subsystem 264.

The node-level redundancy error detection subsystem 266 operates to detect node-level redundancy errors. Thus, the node-level redundancy error detection subsystem 266 may detect an error or failure in which a node device on the PRP network is able to communicate via one of the LANs 220 and 230 but not both LANs. For example, the node device may be physically disconnected from one of the LANs 220 and 230 and may not be capable of self-reporting the error and/or communications may not be transmitting/forwarding correctly through one of the LANs 220 and 230.

In various embodiments, the node-level redundancy error detection subsystem 266 maintains a first record of information for missing duplicate frames expected from each node device connected to the PRP network via the first LAN 220. The node-level redundancy error detection subsystem 266 maintains a second record of information for missing duplicate frames expected from each node device via the second LAN 230. Each frame sent via the PRP network is duplicated for transmission on LAN A 220 and for transmission on LAN B 230. The first duplicated frame received by the IED 250 is considered the forwarded duplicate frame because it is forwarded for use. The second duplicate frame received by the IED 250 is considered the discarded duplicate frame because it is discarded. Each time a forwarded duplicate frame is received via the second LAN 230, the first record of information is updated to include information identifying a missing duplicate frame that is expected to be received via the first LAN 220. The information identifying the missing duplicate frame may include any characteristic information of the corresponding forwarded duplicate frame received via the second LAN 230. Each time a forwarded duplicate frame is received via the first LAN 220, the second record of information is updated to include information identifying the corresponding missing duplicate frame that is expected to be received via the second LAN 230.

The node-level redundancy error detection subsystem 266 detects when one of the first and second records of information for missing duplicate frames has a missing duplicate frame for longer than a delay threshold period or amount of time.

The node-level redundancy error detection subsystem 266 may maintain a count of the missing duplicate frames in each of the first and second records of information. For each duplicate frame received via a particular LAN (a forwarded duplicate frame), a corresponding duplicate frame should be received and discarded on the other LAN within a delay threshold amount of time (the corresponding discarded duplicate frame). Until the corresponding discarded duplicate frame is received and discarded, it is considered a missing duplicate frame expected to be received via the other LAN. The node-level redundancy error detection subsystem 266 may increment a discrepancy counter if a missing duplicate frame persists for longer than the delay threshold amount of time.

For example, if the IED 250 receives a frame (Frame 1) from a node device (i.e., a "sender" node device) on the first LAN 220, information identifying the frame is added to the second record as a missing duplicate frame (Frame 1') expected to be received via the second LAN 230. Likewise, if the IED 250 receives a frame (Frame 2) from the sender node device on the second LAN 230, information identifying the frame is added to the first record as a missing duplicate frame (Frame 2') expected to be received via the first LAN 220.

In one embodiment, minimizing resource consumption and data storage may be prioritized by having the first record be a count of the number of missing duplicate frames expected from a specific node device via the first LAN 220. In this minimalist embodiment, the second record may include a count of the number of missing duplicate frames expected from the specific node device via the second LAN 230. In some embodiments, the first and second records may include counts of the number of missing duplicate frames expected from multiple node devices via the first and second LANs 220 and 230, respectively. In some embodiments, resource and consumption may be further prioritized by having each record include only a count of missing duplicate frames associated with a particular communication protocol of interest (or protocols of interest), such as high-importance protocols like GOOSE or SV.

In a fully functional and redundant PRP network, the count of the number of missing duplicate frames in each of the first record and the second record should be zero. More specifically, in a fully functional and redundant PRP network, the same frames should be received in perfect duplicate on the first LAN 220 and the second LAN 230. That is for every forwarded duplicate frame on one LAN, there should be a corresponding discarded duplicate frame on the other LAN. The node-level redundancy error detection subsystem 266 determines if a missing duplicate frame in the first or second records has persisted for longer than an acceptable delay threshold period of time and reports an error or increments a discrepancy counter.

In some embodiments, the node-level redundancy error detection subsystem 266 determines or detects an error when the discrepancy counter exceeds a threshold count value and/or persists longer than a threshold length of time (a threshold time value). For example, a mismatch in the discrepancy counter of a single missing duplicate frame or only a handful of missing duplicate frames may be acceptable in a particular network environment. In other embodiments, even a single missing duplicate frame may be sufficient to determine that a failure has occurred. It is expected that a frame (Frame 1) may arrive on the first LAN 220 at a slightly different time than its duplicate (Frame 1') on the second LAN 230.

Accordingly, the count of missing duplicate frames in each of the first and second records is expected to be non-zero for short periods of time. Accordingly, the node-level redundancy error detection subsystem 266 may only increment the discrepancy counter and/or detect that a failure has occurred when the count of missing duplicate frames associated with a particular LAN persists for longer than a threshold length of time (e.g., the delay threshold).

In some embodiments, more resources may be allocated to the node-level redundancy error detection subsystem 266. In such embodiments, the node-level redundancy error detection subsystem 266 may maintain first and second records of the missing duplicate frames expected on the first LAN 220 and the second LAN 230, respectively, that include additional detail. A technician, user, supervisor device, or the like may use the additional detail to identify the cause of the failure in the PRP network.

For example, information identifying missing duplicate frames in the first and second records may include information identifying the MAC address and/or IP address of the sender of the corresponding forwarded duplicate frame. In some embodiments, the additional information associated with each missing duplicate frame in the first and second records may be used by a technician to, for example, discover SAN devices connected to one of the LANs (e.g., either LAN 220 or LAN 230). In some embodiments, the additional information may be used by a technician to, for example, identify rogue or unexpected devices connected to one or both LANs (e.g., LAN 220 and/or LAN 230).

In various implementations, the delay threshold time value is between 1 second and 15 seconds. As previously described, the first and second records may specifically include information identifying the communication protocols of the missing duplicate frames. In such instances, the node-level redundancy error detection subsystem 266 may identify non-zero counts of missing duplicate frames associated with a specific communication protocol for the first and second LANs 220 and 230. For example, the node-level redundancy error detection subsystem 266 may be specifically configured to maintain records of missing duplicate frames that use or are otherwise associated with GOOSE and/or Sampled Values (SV) communication protocols (e.g., as described in the IEC 61850 communication protocols). The node-level redundancy error detection subsystem 266 may detect a failure if the count of missing duplicate frames for the particular communication protocol on the first LAN 220 exceed a threshold value (e.g., one or more). Similarly, the node-level redundancy error detection subsystem 266 may detect a failure if the count of missing duplicate frames for the particular communication protocol on the second LAN 230 exceeds a threshold value (e.g., one or more).

Figure 3:
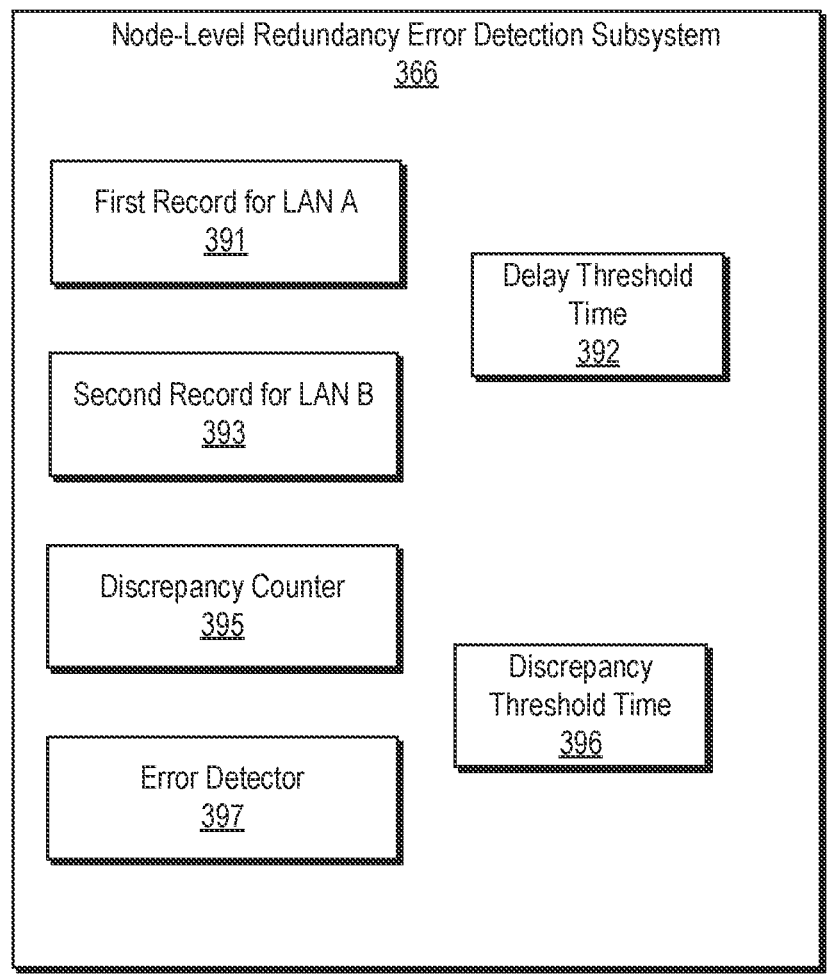
FIG. 3 illustrates a block diagram of a node-level redundancy error detection subsystem, according to one embodiment.

FIG. 3 illustrates a block diagram of a node-level redundancy error detection subsystem 366, according to one embodiment. As illustrated, the node-level redundancy error detection subsystem 366 maintains a first record 391 for a first LAN (LAN A) of a PRP network. The node-level redundancy error detection subsystem 366 maintains a second record 393 for a second LAN (LAN B) of a PRP network. As described above, various possible record maintenance approaches may be implemented depending on the available computing resources, available data storage, desired error detection speed, desired error detection accuracy, and the diagnostic information desired to be made available in conjunction with an error or failure report.

In one embodiment, the first record 391 includes a count of the number of missing duplicate frames associated with the first LAN, and the second record 393 includes a count of the number of missing duplicate frames associated with the second LAN. In another embodiment, the first record 391 includes a count of the number of missing duplicate frames associated with the first LAN from each distinct node device, and the second record 393 includes a count of the number of missing duplicate frames associated with the second LAN from each distinct node device. In one embodiment, if a particular missing duplicate frame persists on the first record 391 or second record 393 for greater than a delay threshold time value 392 (e.g., 1-5 seconds), then the discrepancy counter 395 is incremented.

In one embodiment, if the count of the number of missing duplicate frames on the first record 391 or second record 393 is greater than zero (or another delay threshold value) for longer than the delay threshold time value 392 (e.g., 1-5 seconds), then the discrepancy counter 395 is incremented. An error detector 397 determines that a node-specific failure has occurred when the discrepancy counter 395 exceeds a discrepancy threshold value (e.g., one or more) for a threshold for longer than the discrepancy threshold time value 396 (e.g., zero or more seconds).

In another embodiment, the first record 391 includes a count of the number of missing duplicate frames expected to be received via the first LAN from one or more specific node devices and/or associated with one or more target communication protocols. The second record 393 includes a count of the number of missing duplicate frames expected to be received via the second LAN from the one or more specific node devices and/or associated with the one or more target communication protocols.

In various embodiments, the first record 391 and the second record 393 may include any amount of additional information about missing duplicate frames for one or more node devices on the PRP network for one or more target protocols. In such embodiments, the error detector 397 can determine that a protocol-specific failure has occurred based on the specific node device and/or communication protocol associated with the missing duplicate frame(s) that triggered the error detection.

Figure 4A:
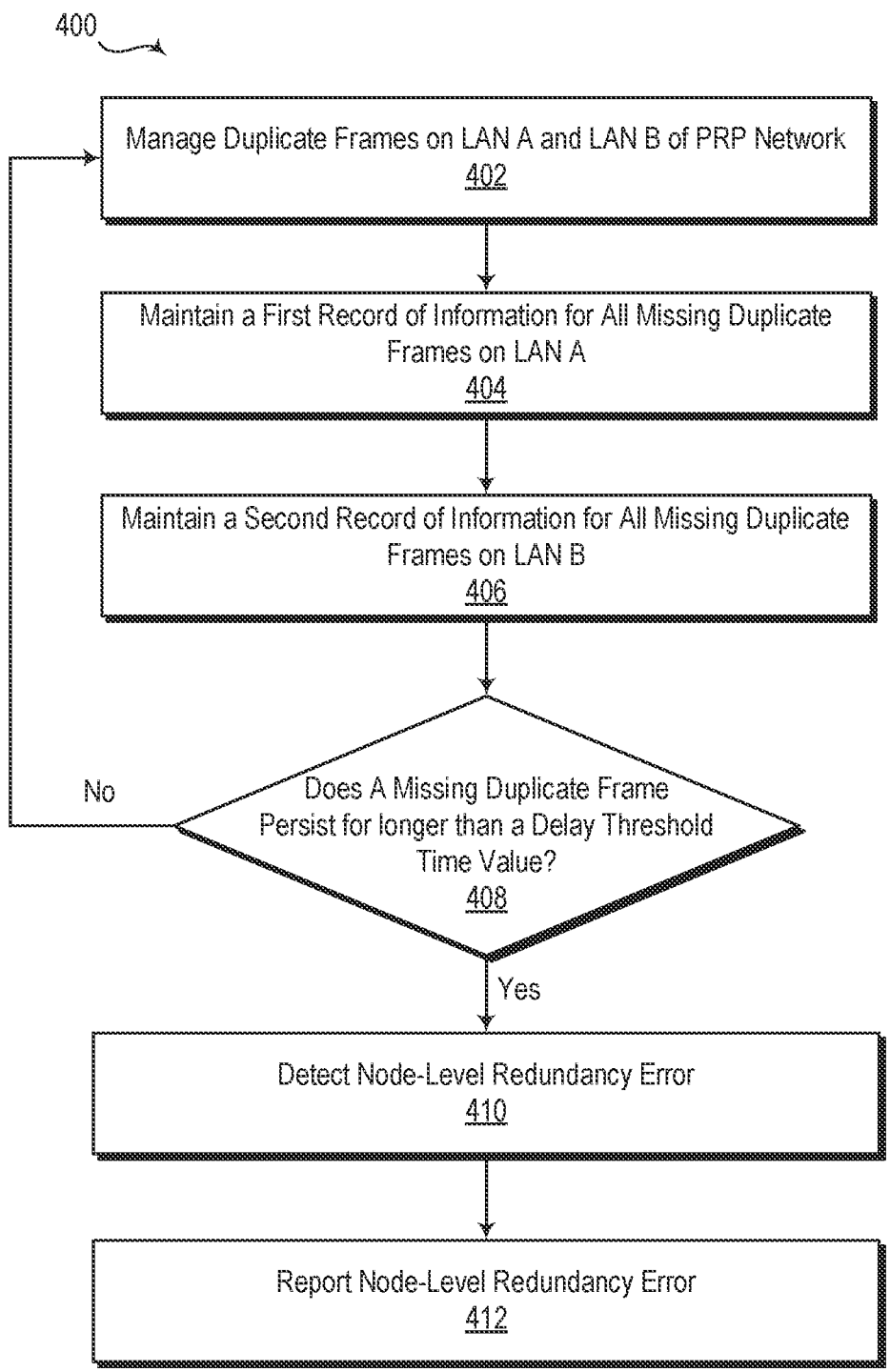
FIG. 4A illustrates a flowchart of a method to detect node-level redundancy errors in a PRP network, according to one embodiment.

FIG. 4A illustrates a flowchart 400 of a method to detect node-level redundancy errors in a PRP network, according to one embodiment. As illustrated, an LRE manages, at 402, duplicate frames from a first node device and a second node device that are connected to an IED via redundant first and second LANs of a PRP network. A node-level redundancy error subsystem maintains, at 404, a first record of information for missing duplicate frames expected to be received via the first LAN (LAN A) from each of the first and second node devices. The node-level redundancy error subsystem maintains, at 406, a second record of information for missing duplicate frames expected to be received via the second LAN (LAN B) from each of the first and second node devices.

The node-level redundancy error subsystem detects that a missing duplicate frame in one of the first and second records has persisted within the record for longer than a delay threshold time value, at 408. The node-level redundancy error subsystem determines, detects, or identifies, at 410, a node-level redundancy error associated with the first node device based on a missing duplicate frame associated with the first node device within one of the first and second records persisting for longer than a threshold time value. A reporting subsystem reports, at 412, the detected node-level redundancy error.

Figure 4B:
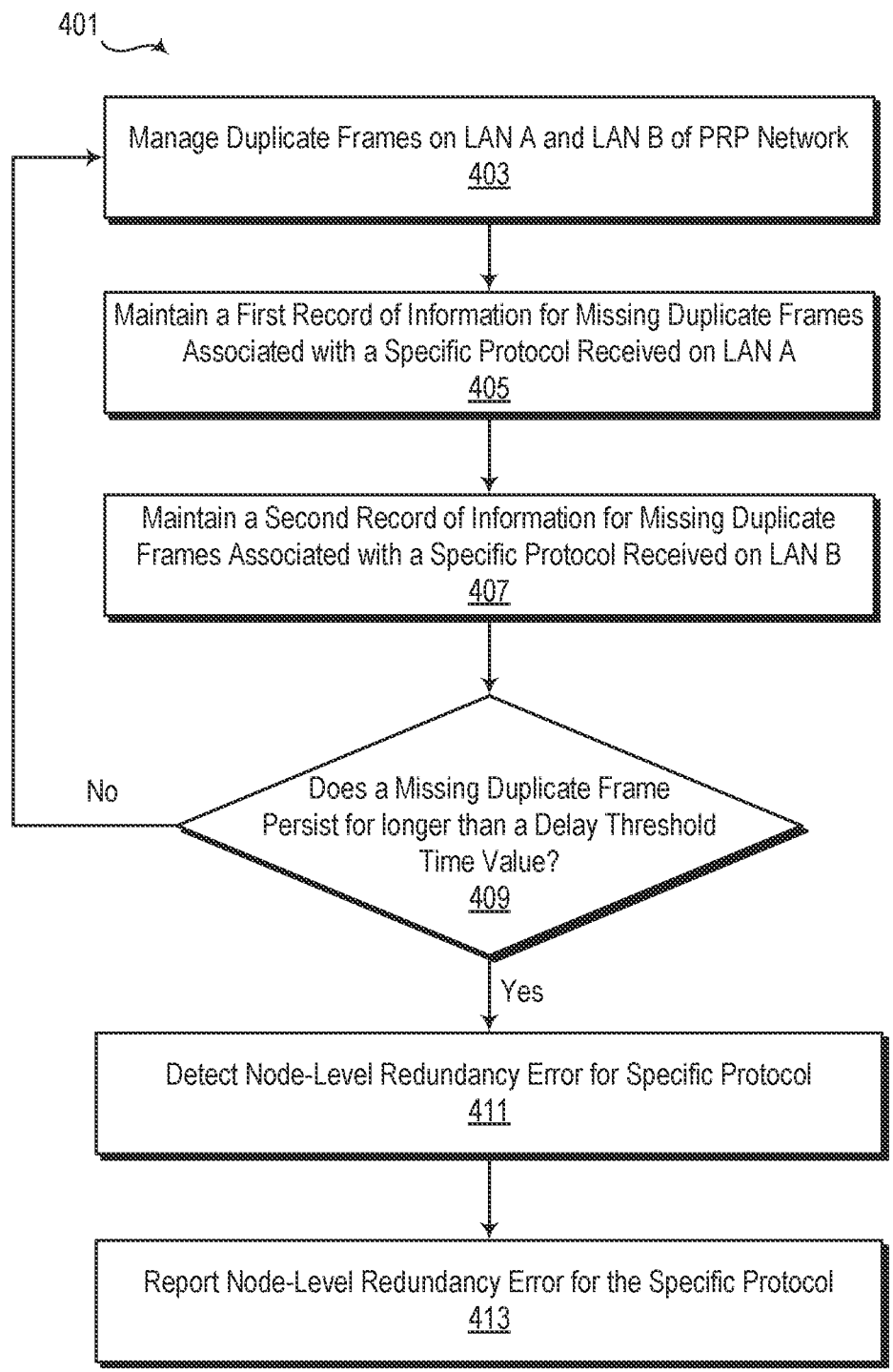
FIG. 4B illustrates a flowchart of a method to detect protocol-specific node-level redundancy errors in a PRP network, according to one embodiment.

FIG. 4B illustrates a flowchart 401 of a method to detect protocol-specific node-level redundancy errors in a PRP network, according to one embodiment. As illustrated, an LRE manages, at 403, duplicate frames from a first node device and a second node device that are connected to an IED via redundant first and second LANs of a PRP network. A node-level redundancy error subsystem maintains, at 405, a first record of information for missing duplicate frames that are associated with a target communication protocol and expected to be received via the first LAN (LAN A) from the first and second node devices. The node-level redundancy error subsystem maintains, at 407, a second record of information for missing duplicate frames that are associated with a target communication protocol and expected to be received via the second LAN (LAN B) from the first and second node devices.

The node-level redundancy error subsystem detects that a missing duplicate frame in one of the first and second records has persisted within the record for longer than a delay threshold time value, at 409. In this embodiment, since the records only contain information for missing duplicate frames for one (or more) specific target communication protocols, the node-level redundancy error subsystem only detects errors associated with the specific target communication protocol(s). The node-level redundancy error subsystem determines, detects, or identifies, at 411, a node-level redundancy error associated with the first node device and the target communication protocol based on a missing duplicate frame associated with the first node device within one of the first and second records persisting for longer than a threshold time value. A reporting subsystem reports, at 413, the detected protocol-specific node-level redundancy error.

In some embodiments, it may be useful to track all missing duplicate frames for all communication protocols and with information identifying sender node devices and/or other network information, as described in FIG. 4A. In other embodiments, it may be useful to track missing duplicate frames for only one specific protocol or specific target protocols associated with the missing duplicate frames, as described in FIG. 4B. Depending on available computing resources, this may also allow for faster detection, reduced memory requirements, and/or reduced computing resources and power consumption.

Figure 4C:
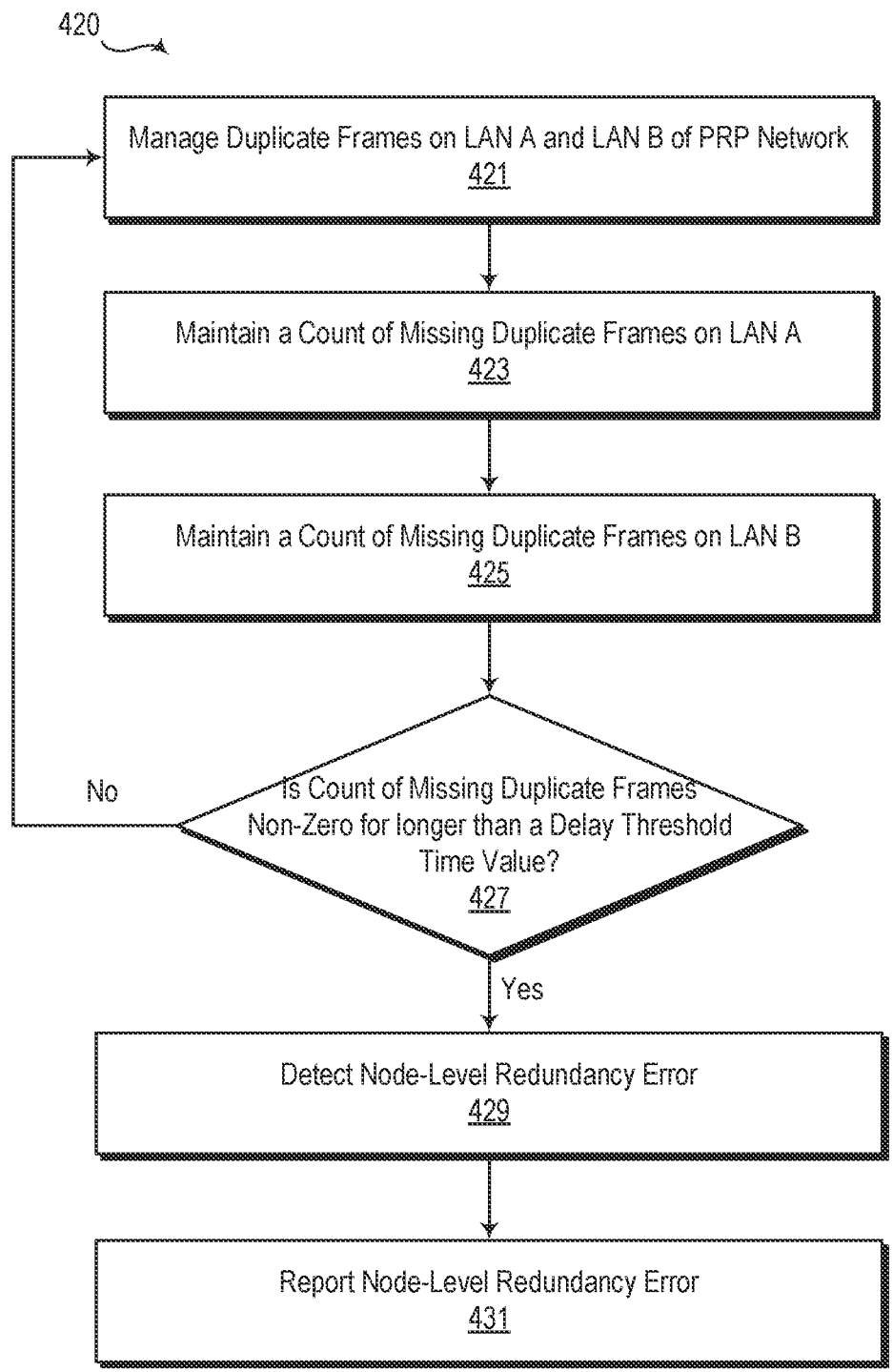
FIG. 4C illustrates a flowchart of a method to detect a node-level redundancy error in a PRP network, according to one embodiment.

FIG. 4C illustrates a flowchart 420 of a method to detect a node-level redundancy error in a PRP network using only a count of missing duplicate frames for each LAN, according to one embodiment. The illustrated embodiment may allow for fast detection, lower power consumption, and/or utilize fewer computing resources. As illustrated, an LRE manages, at 421, duplicate frames from a first node device and a second node device that are connected to an IED via redundant first and second LANs of a PRP network. A node-level redundancy error subsystem maintains, at 423, a count of missing duplicate frames associated with the first LAN (LAN A) without associated node or communication protocol information. The node-level redundancy error subsystem maintains, at 425, a count of missing duplicate frames associated with the second LAN (LAN B) without associated node or communication protocol information.

If the count of missing duplicate frames is non-zero for longer than a delay threshold time value, at 427, then the node-level redundancy error subsystem determines, detects, or identifies, at 429, a node-level redundancy error associated with the node device whose count was non-zero for longer than the delay threshold time value. A reporting subsystem reports, at 431, the detected protocol-specific node-level redundancy error.

Figure 5A:
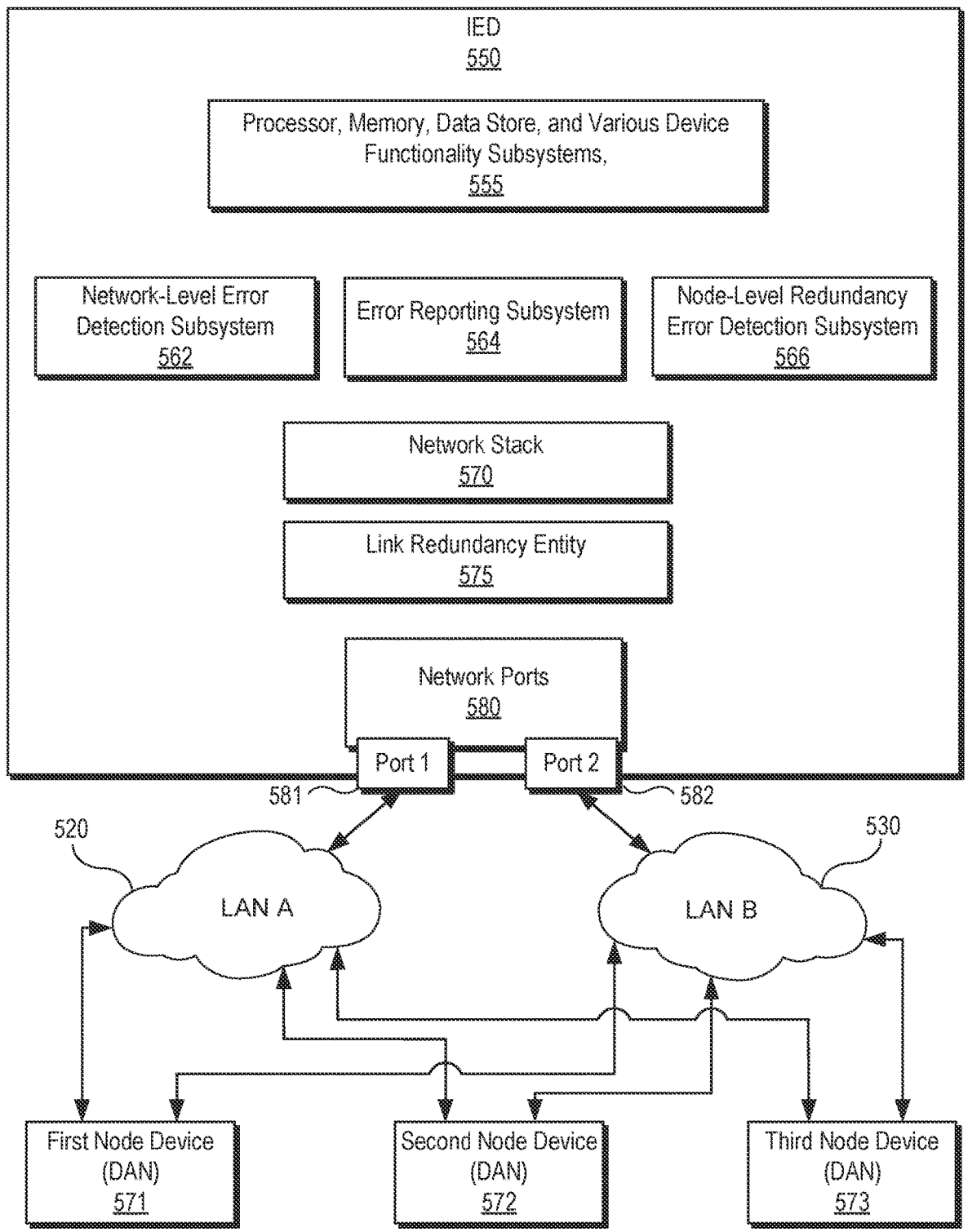
FIG. 5A illustrates a block diagram of a PRP network with an IED configured to detect network-level and node-level redundancy errors in a PRP network, according to one embodiment.
Figure 5B:
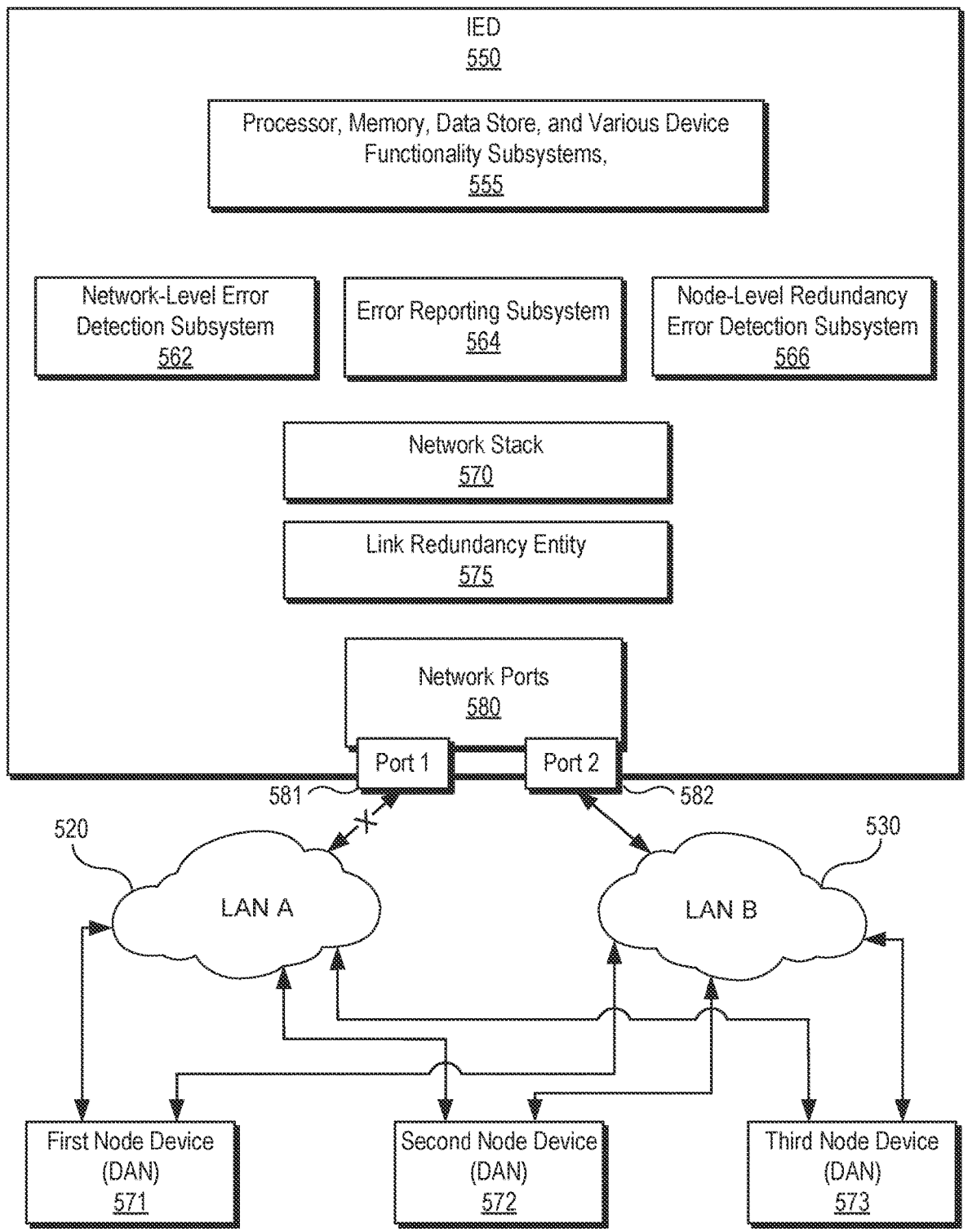
FIG. 5B illustrates the block diagram of the IED in the PRP network of FIG. 5A with a network-level failure error, according to one embodiment.
Figure 5C:
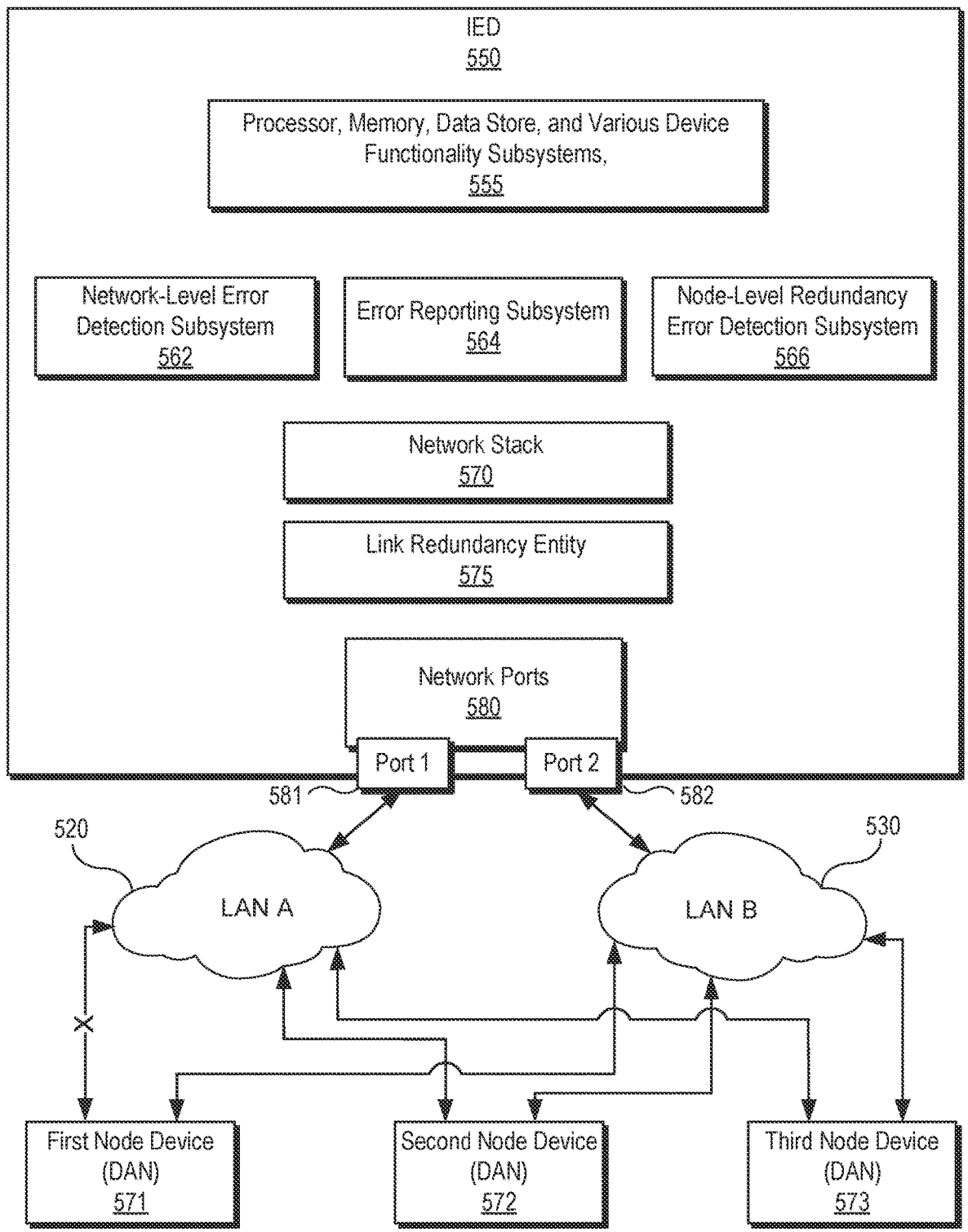
FIG. 5C illustrates the block diagram of the IED in the PRP network of FIG. 5A with a node-level failure error, according to one embodiment.

FIG. 5A illustrates a block diagram of a PRP network with an IED 550 configured to detect both network-level errors and node-level redundancy errors in a PRP network, according to one embodiment. The IED 550 is capable of detecting errors and redundancy failures that only affect one or some protocols but not all communication protocols. FIG. 5B and FIG. 5C provide graphical illustrations of different types of network failures that can be detected by the IED 550. While the illustrated block diagram of FIG. 5A focuses on the networking and network failure detection components, the IED 550 may have a primary function associated with monitoring, protecting, or controlling mechanical or electrical devices in a critical infrastructure system.

For example, the IED 550 may operate within a power generation facility, a power distribution system, a manufacturing facility, a packaging facility, or another commercial or industrial enterprise. The box labeled processor, memory, data store, and various device functionality subsystems 555 represents hardware and software components of the IED 550 useful for the primary purpose of the IED 550. Some of these computing resources may be shared or utilized by the networking components and subsystems.

As illustrated, the IED 550 is connected to a first LAN 520 (LAN A) of a PRP network via a first port 581 of a plurality of physical network ports 580. The IED 550 is also connected to a second LAN 530 (LAN B) of a PRP network via a second port 582 of the plurality of physical network ports 580. As such, the IED 550 is a doubly attached node (DAN) in the PRP network. Any number of additional DANs may be connected to the PRP network. The simplified block diagram includes a first node device 571, a second node device 572, and a third node device 573 that are each connected to the PRP network via independent connections to the first LAN 520 and the second LAN 530. Each of the first, second, and third node devices 571, 572, and 573 transmit redundant (duplicate) frames via the first and second LANs 520 and 530 to the IED 550.

The IED 550 includes an LRE 575 that manages duplicate frames received via the first and second LANS 520 and 530. The LRE 575 may implement duplication of transmitted frames and discard received duplicate frames in a manner that is transparent to the other layers of the OSI network model in the network stack 570 and to the IED 550 itself. The IED 550 also includes a network-level error detection subsystem 562, an error reporting subsystem 564, and a node-level redundancy error detection subsystem 566, consistent with other embodiments described herein. In some embodiments, each of the network-level error detection subsystem 562, the error reporting subsystem 564, and the node-level redundancy error detection subsystem 566 is a standalone subsystem within the IED 550. In other embodiments, one or more of the network-level error detection subsystem 562, the error reporting subsystem 564, and the node-level redundancy error detection subsystem 566 may be combined together as a single subsystem or further divided into sub-subsystems. In still other embodiments, one or more of the network-level error detection subsystem 562, the error reporting subsystem 564, and the node-level redundancy error detection subsystem 566 may be combined with the LRE 575 and/or the network stack 570.

The network-level error detection subsystem 562 operates to detect network-level failures and other errors in which an entire network failure has occurred with one of the LANs 520 and 530, from the perspective of the IED 550. For example, the network-level error detection subsystem 562 can detect that a network cable is unplugged from the second port 582, which results in a complete loss of communication over the second LAN 530. Similarly, the network-level error detection subsystem 562 can detect that, despite the network cable being physically connected between the second port 582 and another device in the second LAN 530, no network traffic is being received via the second port 582.

The network-level error detection subsystem 562 helps to detect a complete loss of redundancy that might otherwise go undetected by the IED 550 since all frames might still be received via the first network port 581, via the first LAN 520. However, the network-level error detection subsystem 562 only detects a complete failure of redundancy. As long as some network traffic is being received via the second network port 582 from some node devices connected to the second LAN 530, the network-level error detection subsystem 562 may indicate that the network is fully operational (e.g., without any failure or errors).

In some embodiments, the network-level error detection subsystem 562 may implement PRP supervision per the PRP protocol. The PRP supervision may include the transmission and reception of supervision frames. A supervision frame may include transmitting a multicast supervision frame via each of the first port 581 and second port 582 to confirm that the connection to the first LAN 520 and the second LAN 530, respectively, are operational. The multicast supervision frames might utilize a first communication protocol to test the ability of a specific node device to communicate on a specific LAN. As such, the multicast supervision frame may be used to confirm that a node device is able to communicate on the LAN via the communication protocol used for the multicast supervision frames. The supervision may rely on each node device (e.g., 571, 572, and 573) sending periodic supervision frames that allow the IED 550 or other supervising device to check the integrity of the network and the presence of the node devices on the PRP network. However, the supervision frames implemented by PRP network protocols are only able to confirm network-level functionality and functionality of the specific communication protocol utilized by the supervision frames. The supervision frames cannot guarantee that frames utilizing or associated with other communication protocols, such as GOOSE or SV, are fully functional.

Accordingly, the presently described systems and methods allow for node-level redundancy error detection, including protocol-specific node-level redundancy error detection. The node-level redundancy error detection subsystem 566 may detect an error or failure in which a node device on the PRP network is able to communicate via one of the LANs 520 and 530 but not both LANs. The node-level redundancy error detection subsystem 566 also detects errors or failures in which the node device on the PRP network is able to communicate with the IED via both LANs 520 and 530 in some communication protocols but is unable to communicate with the IED 550 via one or both of the first and second LANs 520 and 530 via one or more communication protocols of interest.

The node-level redundancy error detection subsystem 566 (or any other subsystem or a combination of one or more subsystems) may track or otherwise have a record of incoming Ethernet frames via both LANs 520 and 530, regardless of whether or not the incoming Ethernet frames contain an RCT. The record of incoming Ethernet frames may be useful to a technician or supervisory system to, for example, detect SAN devices connected on either LAN A 520 or LAN B 530. In some embodiments, the node-level redundancy error detection subsystem 566 and/or the error reporting subsystem 564 may use the record of incoming Ethernet frames to transmit or otherwise raise an alarm of unbalances in the network. An unbalanced PRP network will create an amount of Ethernet traffic with frames containing an RCT trailer on the LAN to which the SAN device is not connected. The node-level redundancy error detection subsystem 566 and/or the error reporting subsystem 564 may flag the received Ethernet frames with an RCT trailer as "missing duplicate frames." This number of "missing duplicate frames" can be used to detect SAN devices connected on either LAN A 520 or LAN B 530 and inform to a technician or supervisory system that a PRP network is unbalanced.

In some applications in which the SAN device is purposely connected to the PRP network, the "missing duplicate frames" associated with SAN devices may be ignored, not added to the records, deleted from the records, or otherwise handled by the system to avoid false alarms. In other applications in which the SAN device is mistakenly, wrongly, accidentally, inadvertently, or maliciously connected to the PRP network, the "missing duplicate frames" associated with SAN devices may be used to inform to a technician or supervisory system that the PRP network is unbalanced.

As described herein, the node-level redundancy error detection subsystem 566 maintains a first record of information for missing duplicate frames expected from each node device 571, 572, and 573 connected to the PRP network via the first LAN 520. The node-level redundancy error detection subsystem 566 maintains a second record of information for missing duplicate frames expected from each node device via the second LAN 530. In one implementation, the first and second records include only a count of the number of missing duplicate frames associated with each respective LAN 520 and 530. Each time a frame is received on one LAN and forwarded as a forwarded duplicate frame, the count of missing duplicate frames is incremented for the other LAN until the missing duplicate frame is received and discarded as a discarded duplicate frame. In a fully functional PRP network, each "missing duplicate frame" is removed from the record or the count is decremented after a short or very short period of time once the duplicate packet is received and discarded as a discarded duplicate frame.

In some embodiments, the first and second records include additional information identifying the missing duplicate frames from one specific node device of interest or from all the node devices 571, 572, and 573. In some implementations, the records may only include counts and/or information associated with missing duplicate frames for specific communication protocols of interest. In other implementations, the records may include counts of all missing duplicate frames received with distinct count values for the number of missing duplicate frames received for each different communication protocol.

The same frames should be received in perfect duplicate on the first LAN 520 and the second LAN 530. The node-level redundancy error detection subsystem 566 detects non-zero counts of missing duplicate frames on the first and second records to identify errors associated with each respective LAN 520 and 530 and/or for each respective communication protocol.

In some embodiments, the node-level redundancy error detection subsystem 566 determines or detects an error when the count of missing duplicate frames exceeds a threshold count value (e.g., exceeds 0, exceeds 10, exceeds 100, etc.) and/or persists longer than a threshold delay time value (e.g., 0.5 seconds, 1 second, 10 seconds, 15 seconds, 30 seconds, etc.), as described herein. In some embodiments, the node-level redundancy error detection subsystem 566 may maintain first and second records with any amount of additional detail to facilitate the diagnosis of the network error after reporting. The error reporting subsystem 564, as described herein, operates to report detected errors, including network errors identified by the network-level error detection subsystem 562 and/or the node-level redundancy error detection subsystem 566.

FIG. 5B illustrates the block diagram of the IED 550 in the PRP network of FIG. 5A with a network-level failure error, according to one embodiment. As illustrated, the first network port 581 of the IED 550 is disconnected from the first LAN 520 (represented by the cross through the network cable). The first network port 581 may be physically disconnected from the first LAN 520 or unable to send or receive any frames despite a functional physical connection. The failure with the first LAN 520 does not affect the ability of the first node device 571, the second node device 572, and the third node device 573 to communicate with the IED 550 via the second LAN 530. However, redundancy is compromised, and correction is warranted. The network-level error detection subsystem 562 may detect the complete failure of the first LAN 520 and report the failure via the error reporting subsystem 564. In some embodiments, as described herein, the network-level error detection subsystem 562 may utilize supervision frames under PRP protocols to detect the complete failure of the first LAN 520.

FIG. 5C illustrates the block diagram of the IED 550 in the PRP network of FIG. 5A with a node-level failure error, according to one embodiment. As illustrated, the first node device 571 is disconnected from the first LAN 520 (again, represented by the cross through the broken network cable). The first node device 571 may be physically disconnected from the first LAN 520 or unable to send or receive frames despite a functional physical connection. From the perspective of the IED 550, the first and second LANs 520 and 530 are still functioning and able to receive dual redundant frames from each of the second node device 572 and the third node device 573.

The node-level redundancy error detection subsystem 566 receives a frame (Frame 1) from the first node device 571 via the second LAN 530. Frame 1 is forwarded for use and considered the forwarded duplicate frame. The node-level redundancy error detection subsystem 566 updates a first record of the missing duplicate frames expected from first node device 571 via the first LAN 520 to include information identifying the missing duplicate frame (Frame 1') expected to be discarded as a discarded duplicate frame. The node-level redundancy error detection system 566 maintains a second record of the missing duplicate frames expected from first node device 571 via the second LAN 530. As described herein, the first and second records may include a count of the number of missing duplicate frames expected from each respective LAN 520 and 530. The first and second records may additionally include any amount of additional information associated with the missing duplicate frames, including information identifying the sender node devices, information identifying intervening devices, etc., according to any of the various embodiments described herein.

The count of missing duplicate frames associated with the second node device 572 and the third node device 573 will be zero since all frames from the first and second node devices 572 and 573 are duplicated through the first LAN 520 and the second LAN 530. However, the count of missing duplicate frames associated with the first LAN 520 and the first node device 571 will be non-zero because the IED 550 does not receive any frames from the first node device 571 via the first LAN 520. The node-level redundancy error detection subsystem 566 confirms that the discrepancy (e.g., that the count of missing duplicate frames is non-zero or exceeds a defined threshold value) and/or that the discrepancy persists for longer than a threshold amount of time. The node-level redundancy error detection subsystem 566 identifies a node-level redundancy failure associated with the first node device 571 and first LAN 520.

Figure 5D:
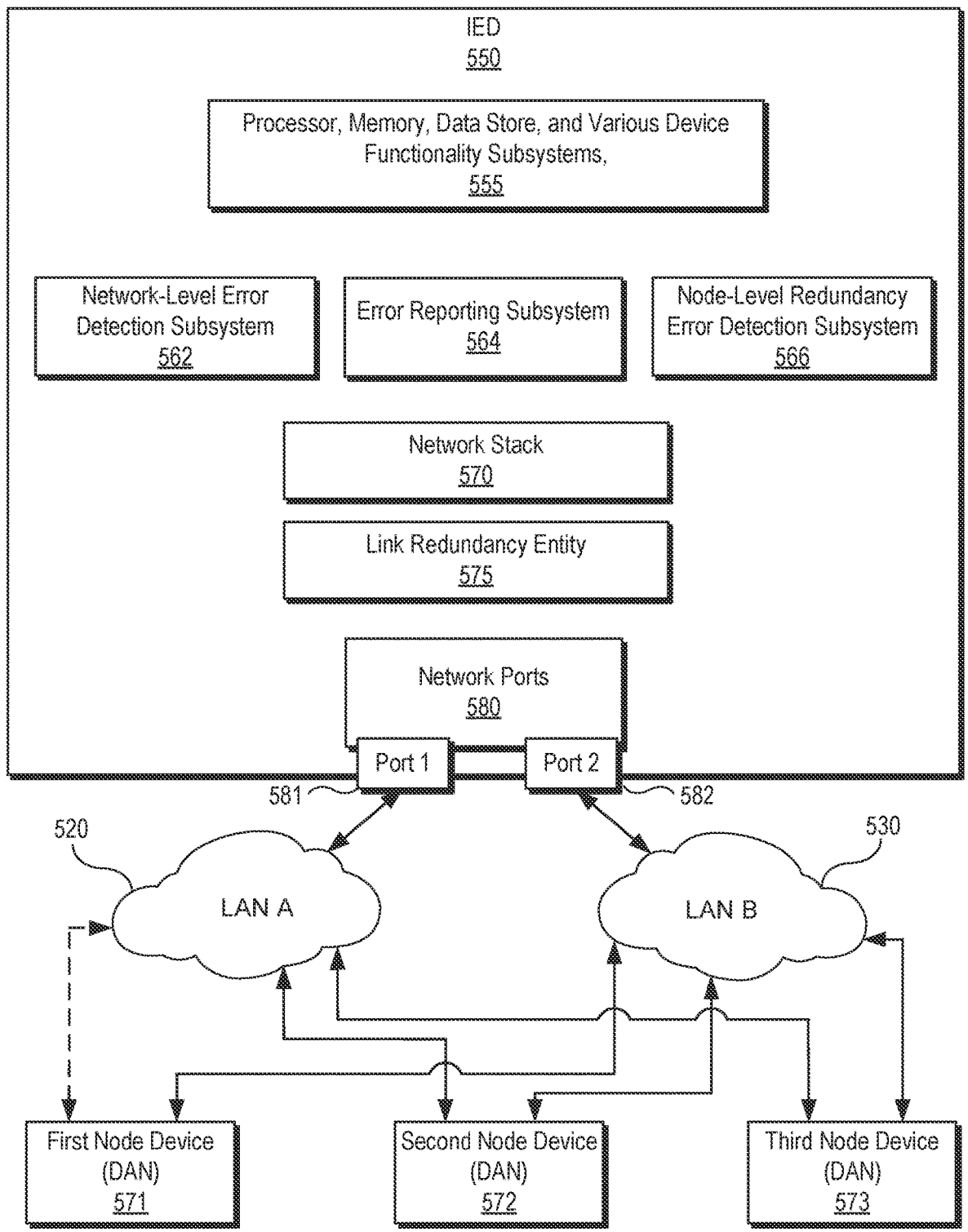
FIG. 5D illustrates the block diagram of the IED in the PRP network of FIG. 5A with a protocol-specific node-level failure error, according to one embodiment.

FIG. 5D illustrates the block diagram of the IED 550 in the PRP network of FIG. 5A with a protocol-specific node-level failure error, according to one embodiment. As illustrated, each of the first node device 571, the second node device 572, and the third node device 573 is able to fully communicate with the IED 550 via the second LAN 530. In the illustrated embodiment, the dashed line connecting the first node device 571 to the first LAN 520 represents a failure in which the first node device 571 is able to communicate with the IED 550 via the first LAN 520 in at least one communication protocol, but not via all communication protocols. For example, the IED 550 may not be receiving frames associated with at least one other communication protocol, such as GOOSE communication protocol or SV communication protocol, via the first LAN 520 from the first node device 571. However, the first node device 571 may be able to transmit frames associated with some other communication protocols, including the communication protocol utilized by PRP supervision frames. As such, an error detection subsystem that utilizes PRP supervision frames would erroneously determine that no failure exists.

The node-level redundancy error detection system 566 is able to detect the protocol-specific node-level redundancy failure. The node-level redundancy error detection subsystem 566 maintains a first record of the missing duplicate frames expected from first node device 571 via the first LAN 520 that are associated with one or more target communication protocols (optionally, all communication protocols). For instance, the node-level redundancy error detection subsystem 566 may maintain a first record of missing duplicate frames expected via the first LAN 520 from the first node device 571 that are associated with GOOSE and/or SV communication protocols. The communication protocol information associated with each missing duplicate frame expected to be received on LAN A 520 is based on the communication protocol of the forwarded duplicate frame received on LAN B 530.

Similarly, the node-level redundancy error detection system 566 maintains a second record of the missing duplicate frames expected from first node device 571 via the second LAN 530 that are associated with the same target communication protocol(s). As described herein, the first and second records may include a count of the number of missing duplicate frames expected via each respective LAN 520 and 530, for each distinct communication protocol, from each node device, and/or with any amount of additional information according to any of the various embodiments described herein.

All frames from the first and second node devices 572 and 573 are duplicated through the first LAN 520 and the second LAN 530, including all frames associated with the target communication protocol(s). Accordingly, the protocol-specific counts of missing duplicate frames associated with the second node device 572 and the third node device 573 will be zero (i.e., every duplicate frame was received by one LAN as a forwarded duplicate frame and by the other LAN as a discarded duplicate frame). However, the protocol-specific first and second counts of missing duplicate frames associated with the first node device 571 do not match because the IED 550 does not receive any frames from the first node device 571 via the first LAN 520 in at least some of the communication protocols. The node-level redundancy error detection subsystem 566 identifies the non-zero count discrepancy and confirms that the discrepancy persists for longer than a threshold amount of time. The node-level redundancy error detection subsystem 566 identifies a protocol-specific node-level redundancy failure associated with the first node device 571.

In embodiments in which the first and second records maintain a count of missing duplicate frames for each distinct node device and each distinct protocol, the error reporting subsystem 564 may report the failure along with information identifying that it is the first node device 571 that has experienced a failure and the specific protocol associated with the failure. In embodiments in which the first and second records maintain a total count of all missing duplicate frames expected, without additional information identifying the specific expected sender node device or communication protocol, the error reporting subsystem 564 may report the failure of the first LAN 520 without any further information.

Figure 5E:
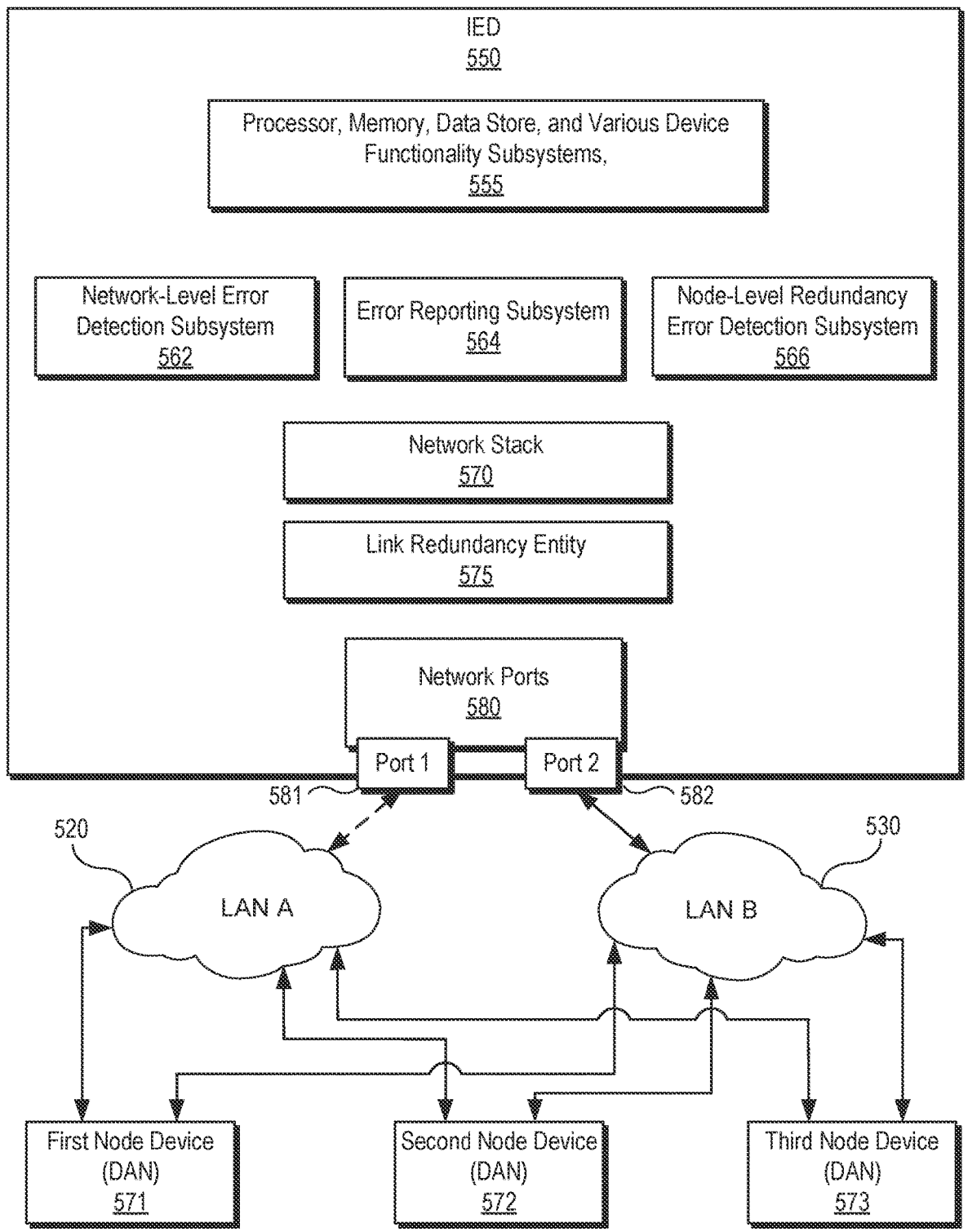
FIG. 5E illustrates the block diagram of the IED in the PRP network of FIG. 5A with a protocol-specific network-level failure error, according to one embodiment.

FIG. 5E illustrates the block diagram of the IED 550 in the PRP network of FIG. 5A with a protocol-specific network-level failure error, according to one embodiment. As illustrated, each of the first node device 571, the second node device 572, and the third node device 573 is able to fully communicate with the IED 550 via the second LAN 530. In the illustrated embodiment, the dashed line connecting the IED 550 to the first LAN 520 represents a failure in which the IED 550 is able to communicate with the first node device 571, the second node device 572, and the third node device 573, via the first LAN 520 in at least one communication protocol, but not via all communication protocols.

For example, the IED 550 may not be receiving frames associated with one or more specific communication protocols, such as GOOSE communication protocol or SV communication protocol, via the first LAN 520 from any of the node devices 571, 572, and 573. The IED 550 may, however, receive and/or transmit frames associated with some communication protocols, including the communication protocol utilized by PRP supervision frames. As such, an error detection subsystem that utilizes PRP supervision frames would erroneously determine that no failure exists.

The node-level redundancy error detection system 566 is able to detect the protocol-specific network-level redundancy failure. The node-level redundancy error detection subsystem 566 maintains a first record of the missing duplicate frames expected from each node device 571, 572, and 573 via the first LAN 520 that are associated with one or more target communication protocols (optionally, all communication protocols). For instance, the node-level redundancy error detection subsystem 566 may maintain a first record of missing duplicate frames expected via the first LAN 520 from each node device 571, 572, and 573 that are associated with GOOSE and/or SV communication protocols.

Similarly, the node-level redundancy error detection system 566 maintains a second record of the missing duplicate frames expected from node devices 571, 572, and 573 via the second LAN 530 that are associated with the same target communication protocol(s). As described herein, the first and second records may include a count of the number of missing duplicate frames expected from each respective LAN 520 and 530 for each distinct communication protocol and/or each distinct node device 571, 572, and 573. According to some embodiments, each record includes only a total count of all missing duplicate frames associated with the target communication protocol(s) received via the first and second LANs 520 and 530, respectively. In other embodiments, each record includes a distinct total count for each node device of missing duplicate frames associated with the target communication protocol(s) for each respective node device 571, 572, and 573 expected via the first and second LANs 520 and 530, respectively. In still other embodiments, each record includes a distinct total count of missing duplicate frames for each distinct node device and each distinct communication protocol for missing duplicate frames associated with the target communication protocol(s) for each respective node device 571, 572, and 573 expected via the first and second LANs 520 and 530, respectively. In various embodiments, the records may further include any amount of additional information associated with the missing duplicate frames, including protocol information, transmission data, timing data, the information contained within the frame RCT, MAC addresses, IP addresses, etc. of the corresponding forwarded duplicate frame.

The count of missing duplicate frames in at least some of the protocol-specific records associated with the first, second, and third node devices 571, 572, and 573 will be non-zero because the IED 550 does not receive any frames via the first LAN 520 associated with at least some of the communication protocols (e.g., GOOSE frames or SV frames). The node-level redundancy error detection subsystem 566 identifies the non-zero count of missing duplicate frames and confirms that the non-zero count of missing duplicate frames persists for longer than a threshold amount of time. The node-level redundancy error detection subsystem 566 identifies a protocol-specific network-level redundancy failure associated with the first node device 571.

In embodiments in which the first and second records maintain a count of missing duplicate frames for each distinct node device and each distinct protocol, the error reporting subsystem 564 may report the failure along with information identifying that it is a protocol-specific failure associated with the entire first LAN 520. In embodiments in which the first and second records maintain a total count of all missing duplicate frames without additional information identifying the specific expected sender node device or communication protocol, the error reporting subsystem 564 may report the failure on the first LAN 520 without any further information.

While specific embodiments and applications of the disclosure have been illustrated and described, the disclosure is not limited to the precise configurations and components disclosed herein. Accordingly, many changes may be made to the details of the above-described embodiments without departing from the underlying principles of this disclosure. The scope of the present disclosure explicitly incorporates, includes, and encompasses the following claims.

What is claimed is:

1. A system, comprising:
   a parallel redundant protocol (PRP) network with multiple local area networks (LANs), including a first LAN and a second LAN;
   a plurality of node devices, including a first node device, wherein each node device is connected to the PRP network via the first LAN and second LAN; and
   an intelligent electronic device (IED) connected to the PRP network via the first LAN and the second LAN, wherein the IED comprises:
   a link redundancy entity (LRE) to manage duplicate frames received from each of the node devices via the first LAN and the second LAN;
   a node-level redundancy error detection subsystem to:
   maintain a first record of information for missing duplicate frames expected from each of the plurality of node devices via the first LAN, wherein each missing duplicate frame expected via the first LAN corresponds to a forwarded duplicate frame received via the second LAN,
   maintain a second record of information for missing duplicate frames expected from each of the plurality of node devices via the second LAN, wherein each missing duplicate frame expected via the second LAN corresponds to a forwarded duplicate frame received via the first LAN,
   identify a missing duplicate frame associated with the first node device in the first record of information that has persisted for longer than a delay threshold time value,
   increment a discrepancy counter in response to the identified missing duplicate frame persisting for longer than the delay threshold time value, and
   detect a node-level redundancy error associated with the first node device based on the discrepancy counter exceeding a discrepancy threshold value for longer than a discrepancy threshold time value; and
   a reporting subsystem to report the detected node-level redundancy error associated with the first node device.

2. The system of claim 1, wherein the delay threshold time value is between 1 second and 15 seconds.

3. The system of claim 1, wherein the discrepancy threshold value is between 0 and 100, and the discrepancy threshold time value is between 0 and 15 seconds.

4. The system of claim 1, further comprising:
a network-level error detection subsystem to detect a failed LAN connection to one of the first LAN and the second LAN.

5. The system of claim 1, wherein the IED comprises:
a first physical network port connected to the first LAN; and
a second physical network port connected to the second LAN.

6. The system of claim 1, further comprising:
a supervisory device connected to the PRP network, and wherein the reporting subsystem is configured to report the detected node-level redundancy error to the supervisory device.

7. The system of claim 1, wherein the first and second records include information identifying a communication protocol of each missing duplicate frame associated with the first and second LANs, respectively, and
wherein the reporting subsystem is configured to report that the detected node-level redundancy error is associated with the first communication protocol.

8. The system of claim 7, wherein the first communication protocol is a communication protocol from a group of IEC 61850 communication protocols consisting of: GOOSE communication protocol and Sampled Values (SV) communication protocol.

9. The system of claim 1, wherein the node-level redundancy error detection subsystem maintains the first and second records to:
include information for missing duplicate frames associated with a GOOSE communication protocol and for missing duplicate frames associated with a Sampled Values (SV) communication protocol; and
exclude information for missing duplicate frames associated with other communication protocols.

10. An intelligent electronic device (IED) connected to a parallel redundant protocol (PRP) network with a first local area network (LAN) and a second LAN, wherein the IED comprises:
a link redundancy entity (LRE) to manage duplicate frames received via the first LAN and the second LAN from each of a plurality of node devices connected to the PRP network, including from a first node device;
a node-level redundancy error detection subsystem to:
maintain a first record of information for missing duplicate frames associated with the first LAN for each of the plurality of node devices, wherein each missing duplicate frame expected via the first LAN corresponds to a forwarded duplicate frame received via the second LAN;
maintain a second record of information for missing duplicate frames associated with the second LAN for each of the plurality of node devices, wherein each missing duplicate frame expected via the second LAN corresponds to a forwarded duplicate frame received via the first LAN, and
detect a node-level redundancy error associated with the first node device based on a missing duplicate frame associated with the first node device within one of the first and second records that persists for longer than a threshold time value; and
a reporting subsystem to report the detected node-level redundancy error associated with the first node device.

11. The IED of claim 10, further comprising:
a network-level error detection subsystem to detect a failed LAN connection to one of the first and second LANs.

12. The IED of claim 10, wherein the first record includes information identifying a media access control (MAC) address of a node device that originated a forwarded frame on the second LAN associated with each respective missing duplicate frame on the first LAN, and
wherein the second record includes information identifying a MAC address of a node device that originated a forwarded frame on the first LAN associated with each respective missing duplicate frame on the second LAN.

13. The IED of claim 10, wherein the node-level redundancy error detection subsystem maintains the first and second records to:
include information for missing duplicate frames associated with a GOOSE communication protocol and for missing duplicate frames associated with a Sampled Values (SV) communication protocol; and
exclude information for missing duplicate frames associated with all other communication protocols.

14. The IED of claim 10, wherein the IED comprises:
a first physical network port connected to the first LAN; and
a second physical network port connected to the second LAN.

15. The IED of claim 10, wherein the reporting subsystem is configured to report the detected node-level redundancy error by one of:
displaying the node-level redundancy error on an electronic display,
transmitting an electronic message to a human operator,
closing an alarm output contact; and
reporting the node-level redundancy error to a supervisory device.

16. The IED of claim 10, wherein the first and second records include information identifying a communication protocol associated with each missing duplicate frame associated with the first and second LANs, respectively, and
wherein the reporting subsystem is configured to report that the detected node-level redundancy error is associated with the first communication protocol.

17. The IED of claim 16, wherein the first communication protocol is a communication protocol from a group of IEC 61850 communication protocols consisting of: GOOSE communication protocol and Sampled Values (SV) communication protocol.

18. A method, comprising:
managing, via a link redundancy entity (LRE) of an intelligent electronic device (IED) connected to a parallel redundant protocol (PRP) network, duplicate frames from a first node device and a second node device, wherein each of the first and second node devices is connected to the IED via redundant first and second local area networks (LANs) of the PRP network;
maintaining, via a node-level redundancy error subsystem, a first record of information for missing duplicate frames received via the first LAN from each of the first and second node devices, wherein each missing duplicate frame expected via the first LAN corresponds to a forwarded duplicate frame received via the second LAN;
maintaining, via the node-level redundancy error subsystem, a second record of information for missing duplicate frames received via the second LAN from each of the first and second node devices, wherein each missing duplicate frame expected via the second LAN corresponds to a forwarded duplicate frame received via the first LAN;

detecting, via the node-level redundancy error subsystem, a node-level redundancy error associated with the second node device based on a missing duplicate frame associated with the second node device within one of the first and second records that persists for longer than a threshold time value; and reporting, via a reporting subsystem, the detected node-level redundancy error associated with the second node device.

19. The method of claim 18, wherein the first and second records include information identifying a communication protocol associated with each missing duplicate frame, and wherein the method further comprises reporting, via the reporting subsystem, that the detected node-level redundancy error is associated with the second node device and the first communication protocol.

20. The method of claim 19, wherein the first communication protocol is a communication protocol from a group of IEC 61850 communication protocols consisting of: GOOSE communication protocol and Sampled Values (SV) communication protocol.

* * * * *